(12) United States Patent
Wiemann et al.

(10) Patent No.: US 12,035,419 B2
(45) Date of Patent: Jul. 9, 2024

(54) UE BASEBAND CAPABILITY SIGNALING

(71) Applicant: Telefonaktiebolaget LM Ericsson (PUBL), Stockholm (SE)

(72) Inventors: Henning Wiemann, Aachen (DE); Håkan Palm, Växjö (SE); Stefan Wager, Espoo (FI); Tao Cui, Upplands Väsby (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 0 days.

(21) Appl. No.: 17/971,732

(22) Filed: Oct. 24, 2022

(65) Prior Publication Data

US 2023/0118561 A1    Apr. 20, 2023

Related U.S. Application Data

(63) Continuation of application No. 16/649,193, filed as application No. PCT/IB2018/057757 on Oct. 5, 2018, now Pat. No. 11,483,700.
(Continued)

(51) Int. Cl.
*H04W 8/24* (2009.01)
*H04B 7/0413* (2017.01)
*H04W 72/0453* (2023.01)

(52) U.S. Cl.
CPC ............ *H04W 8/24* (2013.01); *H04B 7/0413* (2013.01); *H04W 72/0453* (2013.01)

(58) Field of Classification Search
CPC ... H04B 7/0413; H04W 8/24; H04W 72/0453
See application file for complete search history.

(56) References Cited

U.S. PATENT DOCUMENTS

2012/0184281 A1*  7/2012  Kim .................... H04W 28/04
                                                          455/450
2013/0243108 A1   9/2013  Chen et al.
(Continued)

FOREIGN PATENT DOCUMENTS

CN    106464408 A    2/2017
CN    109548007 A    3/2019
(Continued)

OTHER PUBLICATIONS

Official Communication issued by the Columbian Government for International application No. PCT/IB2018/057757—Nov. 25, 2022.
(Continued)

*Primary Examiner* — Brian P Cox
(74) *Attorney, Agent, or Firm* — Baker Botts L.L.P.

(57) ABSTRACT

According to some embodiments, a method of signaling device capabilities for use in a wireless device comprises compiling frequency band combinations supported by the wireless device. The method further comprises compiling a set of device capabilities supported by the wireless device and assembling a capability message. The capability message includes: the frequency band combinations; combinations of the device capabilities supported by the wireless device; and for each of the one or more frequency band combinations, the capability message includes a first indication of one or more device capabilities supported by the frequency band combination. The first indication of the device capabilities supported by the frequency band combination comprises, for each band of the plurality of frequency bands, an indication of one of the one or more combinations of the device capabilities supported by the band when used in combination with the other bands in the frequency band combination.

20 Claims, 7 Drawing Sheets

Related U.S. Application Data

(60) Provisional application No. 62/569,345, filed on Oct. 6, 2017.

(56) References Cited

U.S. PATENT DOCUMENTS

| | | | |
|---|---|---|---|
| 2014/0092825 A1 | 4/2014 | Boström et al. | |
| 2015/0327269 A1 | 11/2015 | Kim et al. | |
| 2016/0234825 A1 | 8/2016 | Axmon et al. | |
| 2018/0206113 A1* | 7/2018 | He | H04W 8/24 |

FOREIGN PATENT DOCUMENTS

| | | | | |
|---|---|---|---|---|
| CO | 15111422 | | 5/2015 | |
| JP | 2016197851 | A | 11/2016 | |
| KR | 20130126427 | A | 11/2013 | |
| WO | WO-2017013113 | A1 * | 1/2017 | H04B 7/0413 |
| WO | 2017027057 | A1 | 2/2017 | |

OTHER PUBLICATIONS

Ericsson, "Capability Signalling Structure for NR", 3GPP TSG-RAN WG2 Meeting #99, Berlin, Germany, Aug. 21-25, 2017, pp. 1-5, R2-1708031, 3GPP.

Ericsson, "Discussion on NR UE capability of baseband functionality", 3GPP TSG-RAN WG4 Meeting #84Bis, Dubrovnik, Croatia, Oct. 9-13, 2017, pp. 1-4, R4-1710928, 3GPP.

Intel Corporation, "Decoupling DL band and UL bands", 3GPP TSG-RAN WG2 #99, Berlin, Germany, Aug. 21-25, 2017, pp. 1-3, R2-1708784, 3GPP.

Intel Corporation, "Email report on [NR-AH2#09] UE capabilities", 3GPP TSG-RAN WG2 #99, Berlin, Germany, Aug. 21-25, 2017, pp. 1-10, R2-1708785, 3GPP.

Samsung, "Further Discussion on Baseband Capability Signaling", 3GPP TSG-RAN WG4 Meeting #84Bis, Dubrovnik, Croatia, Oct. 9-13, 2017, pp. 1-6, R4-1711030, 3GPP.

China Patent Office Official Action dated Dec. 5, 2023 in Application No. 202210888355.3 (not translated).

\* cited by examiner

UE BASEBAND CAPABILITY SIGNALING

PRIORITY

This application is a continuation, under 35 U.S.C. § 120, of U.S. patent application Ser. No. 16/649,193 filed on Mar. 20, 2020, which is a U.S. National Stage Filing under 35 U.S.C. § 371 of International Patent Application Serial No. PCT/IB2018/057757 filed Oct. 5, 2018 and entitled "UE BASEBAND CAPABILITY SIGNALING" which claims priority to U.S. Provisional Patent Application No. 62/569, 345 filed Oct. 6, 2017, all of which are hereby incorporated by reference in their entirety.

TECHNICAL FIELD

Particular embodiments are directed to wireless communications and, more particularly, to signaling user equipment (UE) capability information for band-combinations and baseband capabilities to the network.

INTRODUCTION

Third Generation Partnership Project (3GPP) fifth generation (5G) includes a new radio interface (often referred to as NR). Herein, the terms 5G and NR may be used interchangeably, and it will be apparent from the context if the term refers specifically to the NR radio interface, or if the terms refer to the broader 5G architectural concepts.

One interaction between a user equipment (UE) (also referred to as a handset, device, mobile station, etc.) and the network (such as a base station or controlling node in the infrastructure) is a message interchange related to UE capabilities. The purpose of the signaling is for the UE to inform the network about features and feature combinations that a UE supports. The network may use the information to configure the UE to perform functions, or combinations of functions, within the UE's capabilities.

The more the network knows about UE capabilities and limitations, the better the network may use the performance of the particular UE for delivering the best possible performance to the user. Therefore, the UE often reports its capabilities to the network at the beginning of a session or connection, and the network then knows what the UE can do during the lifetime of the session or connection. Often, a network request triggers the capabilities report from the UE. An example is illustrated in FIG. 1.

FIG. 1 is a sequence diagram illustrating an example of a user equipment (UE) signaling capability information to the network. Network node 20 sends a UECapabilityEnquiry message to UE 10, and UE 10 responds with a UECapabilityInformation message. The procedure can also be used during a connection lifetime, if needed. The network-side that receives the UECapabilityInformation message can be a radio base-station such as an eNB in long term evolution (LTE), a gNB in NR, or another node in the infrastructure, such as a core-network node.

LTE (also known as evolved UMTS terrestrial radio access network (EUTRAN)) includes transfer of UE capabilities. Transferring UE capabilities in LTE, however, has become rather complicated. The LTE solution results in large messages, because the solution provided in the LTE specifications is based on a principle where the UE reports detailed information about the combinations of features that the UE can support on specific bands and band-combinations.

While having detailed information in the network about precise capabilities of the UE is good on one hand, the versatile LTE solution has resulted in very large messages. The particular solution also results in the need to maintain large sets or tables of information in the network to figure out what the UE is able to perform.

A goal of any UE capability solution is to specify a comprehensive/complete set of UE capabilities based on which an eNB can unambiguously determine the features supported by a particular UE. Testability is also a key strength of 3GPP systems. The established practice that UE vendors indicate support for a feature only after having successfully tested it with at least two networks led to stable systems and should be continued in this manner.

Another paradigm of capability transfer and subsequent configurations is that the network shall configure the UE in-line with the indicated capabilities. If the network attempts to apply a configuration for which the UE has not indicated support, the UE may (and likely will) reject the configuration. On the other hand, if an RRCConnectionReconfiguration message, which is used for configuring the UE, is compliant with the UE capabilities, the UE shall not reject it.

After transmitting the capabilities to the network, the capabilities of the UE can be stored in the network for future use. In one solution, the capabilities are also stored in the core-network, such as an MME (Mobility Management Entity), if the UE goes to Idle, i.e. after the session or connection is terminated. In E-UTRA, the eNB attempts to fetch the capabilities for a connecting UE from the MME. If the MME has not stored the capabilities for the UE, the eNB fetches them from the UE. While this reduces the signaling over the radio interface during (most/many) connection establishments, it anyway requires a lot of storage and transmission in the radio access network (RAN) and the core network (CN). The node can be a node different from an MME, as long as it is capable of storing the UE capabilities for future use.

As described above, one of the problems of the LTE UE capability solution comes from the explicit signaling for support of bands and band-combinations together with corresponding baseband capabilities. Herein, the term baseband capabilities may refer to certain UE capabilities that do not directly or necessary relate to any band or carrier frequency. Such capabilities include, for example, information whether the UE supports processing multiple layers using multiple antennas, generally called MIMO or MIMO antennas. For a UE, it requires more processing to support e.g. 8 layers over 4 layers, or 4 layers over 2 layers. This processing is not necessarily dependent on whether the carrier frequency f1 or f2 is in use.

Similar features include, for example, NAICS (Network-Assisted Interference Cancellation and Suppression), which is also a feature that requires significant processing power to reduce interference from other transmission signals on the signal that is intended for the particular user equipment. Also, NAICS is, at least in part, independent of the carrier frequency that the UE is currently using for receiving (and transmitting). CSI (Channel State Information) is another processing-intensive feature wherein the UE is measuring and estimating the character and quality of downlink channels based on various reference symbols or signals sent by the network. The purpose of CSI is to feed back channel state information to the network, so that the network can, for example, schedule resources (e.g., allocate resources including frequency resources, antenna constellations, modulation and coding) in the most efficient way.

Other parameters that can be, at least in part, independent of the band or carrier frequency are the total bandwidth, or the number of carrier frequencies within a band, that the UE supports in uplink or downlink. Another feature that the UE signals is what uplink carrier frequency or frequencies that the UE supports in combination with certain downlink carrier frequencies.

These examples should not be seen as limiting the scope, but the embodiments described below can be applied to additional baseband capabilities that can be defined in a generic way, as will be further described below.

Returning to the LTE problem, the UE provides explicit signaling of what bands and band combinations that the UE can support. However, within each such band and band combination, the UE further signals what additional features the UE can support for that particular combination. For example, if the UE is capable of, as one example, simultaneous receive on carriers f1, f2, and f3 in the downlink using carrier aggregation, the UE further signals what MIMO, NAICS and uplink carrier frequency or frequencies it can support with that particular combination of f1+f2+f3. However, a UE that supports the reception on all three carriers also supports reception on, for example, the combinations of f1+f2, f1+f3, f2+f3, and each of the carriers individually. Because the "baseband capabilities" are not necessarily the same for all combinations, the UE may signal explicitly what baseband features (MIMO, NAICS, etc.) that the UE supports for each combination. Sometimes the uplink (UL) support is different for the combinations, which results in yet another duplication of the capabilities.

It should be noted that one band may include many carriers (i.e., on a band that is identified with a number, center frequency, or identity f1, the band may be further split into additional portions of the band that may be referred to as a carrier). For example, a band may comprise 100 MHz, which is subdivided into five carriers of 20 MHz. A UE may receive one or multiple such carriers. If a UE receives or transmits on multiple such carriers, it is often said to operate using carrier aggregation.

The combinatory issue results in large and complicated UE capability information messages being sent from the UE to the network, and there is a need to have a better solution for NR.

One reason why a UE may need to report different baseband capabilities for different bands and band combinations is that the processing capability of, for example, MIMO is dependent on how many bands that the UE is currently using. For example, a UE may support 8 times 8 MIMO when the UE uses one carrier on band f1, but only 4 by 4 when the UE uses carriers on both f1 and f2, and even less if the UE uses f1, f2, and f3. Further, the UE may support 8 times 8 MIMO without NAICS on a carrier, but only 4 times 4 MIMO if NAICS is used. Thus, efficiently signaling the combinations is a significant challenge.

The following section describing the structure of the signaling message in LTE is included here for reference. In LTE, the UE lists all supported band combinations explicitly in the supportedBandCombination information element (IE). Each BandCombinationParameters entry specifies the properties of one supported band combination. There are capabilities per band combination but also additional capabilities per Band of a band combination (inside BandParameters) and even separated between uplink (CA-MIMO-ParametersUL) and downlink (CA-MIMO-ParametersDL).

```
BandCombinationParameters-r13 ::=        SEQUENCE {
    differentFallbackSupported-r13                    ENUMERATED {true}
        OPTIONAL,
    bandParameterList-r13                             SEQUENCE         (SIZE
(1..maxSimultaneousBands-r10)) OF BandParameters-r13,
    supportedBandwidthCombinationSet-r13
    SupportedBandwidthCombinationSet-r10                     OPTIONAL,
    multipleTimingAdvance-r13                         ENUMERATED {supported}
        OPTIONAL,
    simultaneousRx-Tx-r13                             ENUMERATED {supported}
        OPTIONAL,
    bandInfoEUTRA-r13                                 BandInfoEUTRA,
    dc-Support-r13                                    SEQUENCE {
        asynchronous-r13                              ENUMERATED {supported}
            OPTIONAL,
        supportedCellGrouping-r13                         CHOICE {
            threeEntries-r13                                  BIT
STRING (SIZE(3)),
            fourEntries-r13
    BIT STRING (SIZE(7)),
            fiveEntries-r13
    BIT STRING (SIZE(15))
        }                                                 OPTIONAL
    }                                                 OPTIONAL,
    supportedNAICS-2CRS-AP-r13                        BIT     STRING      (SIZE
(1..maxNAICS-Entries-r12))        OPTIONAL,
    commSupportedBandsPerBC-r13                       BIT STRING (SIZE (1..
maxBands))             OPTIONAL
}
BandParameters-r13 ::= SEQUENCE {
    bandEUTRA-r13
    FreqBandIndicator-r11,
    bandParametersUL-r13                                  BandParametersUL-
r13        OPTIONAL,
    bandParametersDL-r13                                  BandParametersDL-
r13        OPTIONAL,
```

```
    supportedCSI-Proc-r13                                    ENUMERATED    {n1,
n3, n4}            OPTIONAL
}
BandParametersUL-r13 ::= CA-MIMO-ParametersUL-r10
CA-MIMO-ParametersUL-r10 ::= SEQUENCE {
    ca-BandwidthClassUL-r10                                  CA-
BandwidthClass-r10,
    supportedMIMO-CapabilityUL-r10                           MIMO-
CapabilityUL-r10                OPTIONAL
}
BandParametersDL-r13 CA-MIMO-ParametersDL-r13
CA-MIMO-ParametersDL-r13 ::= SEQUENCE {
    ca-BandwidthClassDL-r13                                       CA-
BandwidthClass-r10,
    supportedMIMO-CapabilityDL-r13                                MIMO-
CapabilityDL-r10                OPTIONAL,
    fourLayerTM3-TM4-r13                                     ENUMERATED
{supported}                    OPTIONAL,
    intraBandContiguousCC-InfoList-r13                    SEQUENCE           (SIZE
(1..maxServCell-r13)) OF IntraBandContiguousCC-Info-r12
}
```

With early implementations of CA band combination signaling, only a fraction of the capabilities were available per band combination. A UE would generally provide one band combination covering, for example, two bands and one or several carriers in each of those bands. A UE supporting two carriers in band X and additionally two carriers in band Y would also support one carrier in each of the two bands. Another assumption was that a UE would support as many uplink carriers as downlink carriers.

In practice, UEs support far less uplink carriers than downlink carriers, which necessitates multiplying the band combinations so that the uplink carrier can either be in one or the other band. UEs duplicate band combination entries to offer the downlink carrier aggregation configuration in combination with different uplink carrier configurations.

Furthermore, UEs are able to support more MIMO layers when configured with fewer carriers. This also creates more duplication of band combination. Similar processing limitation for NAICS and CSI processes result in even more band combination lists. UEs duplicate band combination entries to offer the carrier aggregation configuration in combination with different other capabilities such as MIMO, CSI-Processes, NAICS.

To solve the problem of transmitting and storing the continuously increasing band combination table, particular solutions attempt to reduce the size of the band combination table. Specifically, the network may request: (a) band combinations only for selected bands; (b) only band combinations up to a certain maximum number of carriers; or (c) exclusion of "fallback" combinations (i.e., omitting CA combinations with fewer carriers than an explicitly signalled CA).

When an eNB uses one of the two former options, the network may not necessarily receive the full UE capabilities. While the provided capabilities may suffice for operation in the current serving cell, another cell may operate at different bands or support more carriers. To be able to serve the UE properly in that cell, the network must re-request the UE capabilities with appropriately adjusted restrictions.

A network supporting (possibly in different places) many different bands may have to request additional subsets of the UE capabilities and it should combine and store those subsequent fractional UE capabilities. A network supporting many carriers does not benefit from the possibility to request UE capabilities only up to a certain number of carriers.

The possibility to exclude so-called fallback combinations has potential to reduce the size of the signaled capabilities significantly. However, as described above, it is common that UEs support, for example, more MIMO layers, more CSI processes or a higher degree of NAICS when configured with fewer carriers. But if the UE omits those "fallback" combinations, the network is not aware of the UE's additional processing capabilities. Thus, the UE indicates that it has "better" fallback combinations available, and the network will eventually request and store those as well.

The efficiency of the "exclude fallback band combinations" mechanism suffers from the fact that most UEs support, for example, more MIMO layers, more CSI processes or a higher degree of NAICS when configured with fewer carriers.

Another proposed solution to improve the UE Capability and the problems known from LTE, includes separating the baseband capabilities from the per band, and band combination capabilities. However, a complete separation may result in less accurate knowledge in the network of what the UE is capable of performing.

If band-combinations are signaled separately, and baseband capabilities independently of the band-combinations, there is a risk that the UE has to provide a conservative capability message. The conservativeness means that the UE, for example, might indicate that it can support only 4 times 4 MIMO on any band combination, while the UE could in fact support better MIMO, such as 8 times 8, for certain band-combinations.

One existing proposal for separating radio frequency from baseband capabilities is outlined as follows. Because of the large number of band-combination-specific parameters, UEs include duplicate entries for most band combinations. This not only increases the overall number of band combinations but also limits the possibility to exclude fallback combinations. A particular goal is to minimize the number of the per-band-combination capabilities without limiting the granularity at which UEs can advertise their features. Particular suggestions for the MIMO, NAICS and CSI-RS-Process related capabilities are included.

The number of MIMO layers that a UE can support depends both on the number of antennas and receiver chains (RF) as well as on the UE's processing power. To reflect the RF (antenna) limitations, the UE could, for example, indicate for each band (not band-combination) how many MIMO layers it supports. For example, Band A: up to 2 Layer; Band B: up to 2 Layer; Band C: up to 4 Layer; and Band D: up to 4 Layer. In addition, but separately from the per-band MIMO capabilities, the UE could indicate its overall MIMO processing capabilities: MIMO Processing Power Capability [Layers×Carriers]: 6.

A UE with the capabilities exemplified above may, for example, be configured with any of the following: (a) three carriers running 2 layer MIMO; (b) two carriers, one with 2 Layer MIMO and one (in band C or D) with 4 Layer MIMO; or (c) one carrier (in band C or D) running 4 layer MIMO. Such a clean separation of RF and processing capabilities would enable removing the MIMO capabilities from the band combination signaling structure. Thus, the UE indicates its MIMO-RF-capability independently for each band and indicates its cumulative Processing-MIMO capability available for all bands.

The number of supported CSI processes as well as NAICS support depend on the UEs processing capability and does not depend on the number of antennas. Thus, the number of CSI processes may be represented as a single processing capability per UE. Alternatively, if UE implementations are expected to tie the processing capability to a radio front-end, as discussed for the MIMO processing, a UE may also convey the CSI-processing capability per set of bands. The number of supported CSI processes and NAICS support depend on the UEs processing capabilities and not on, for example, the number of available antennas.

UE implementations, however, will typically share the same processing resources across functions such as MIMO, CSI measurements and NAICS. Thus, a UE may be able to run with more CSI processes if configured for fewer MIMO layers and vice versa. Accordingly, per UE baseband capabilities separated from the band combinations (e.g. FD-MIMO capabilities, number of CSI processes, etc.) may help minimize per band combination signaling.

Particular solutions may use a band combination (BC) table (listing at least all supported combinations of bands and the number of carriers per band). In addition to the band combination (BC) table, a second table lists supported combinations of baseband processing capabilities (BPC). The entries in the second table may indicate a number of carriers that they can be used with. Upon selecting a band combination and the number of carriers (in accordance with the BC table), the network may extract from the BPC table all entries that are available for the chosen number of carriers. Based on the extracted entries of the BPC table, the network may choose the baseband features that the UE supports and configure the UE accordingly.

UE vendors may, however, see the problem that the separate tables (BC and Baseband Capabilities) force them to support all the features on all their bands (i.e., if the baseband capability table has an entry for "2 Carriers: 40 MHz NAICS," the UE must support 40 MHz NAICS on all bands for which they advertise a band combination with 2 carriers).

Another problem is that the processing power in the UE is not always available for any action. Some of the processing may be associated with certain radio chains. If in some band combinations one such radio chain serves several carriers, it might not have enough power to perform MIMO or NAICS there. The fact that another radio chain has unused processing power left does not help in this case.

SUMMARY

As described above, a complete separation of baseband capabilities from band-combinations results in suboptimal performance. The full performance of the user equipment (UE) cannot be utilized because the network has insufficient knowledge about the best configuration that the UE can handle for a set of configured carriers on a set of bands.

UEs are often implemented using multiple radio front-ends (also called e.g., radio chains, or base-band processing units), particularly for different bands, and particularly if the bands are far apart in the radio spectrum. Sometimes, different modems might be used for terminating the radio interface of different bands, particularly if the different bands differ substantially in radio frequency or in the way the technology is implemented. The radio front ends may even implement different standards, such as long term evolution (LTE) and fifth generation (5G) new radio (NR). Particular embodiments facilitate different bands or band groups using different radio technologies.

Thus, a UE may use multiple resources for base-band processing. However, in an example, the resources for processing bands f1 and f2 are not necessarily available for band f3 or f4. The UE may use network-assisted interference cancellation and suppression (NAICS) and 8×8 multiple-input multiple-output (MIMO) on any combination of carriers on band f1 and f2, but the UE may only support 4×4 MIMO on bands f3 and f4, and no NAICS on those bands.

Using the previous approach of disconnecting baseband capabilities from band combinations, the UE would report only 4×4 MIMO capability and no NAICS capability, and the network would not be informed that the UE in fact can support 8×8 MIMO and NAICS on the carriers of bands f1 and f2 and on combinations of f1 and f2.

Particular embodiments, therefore, provide an adequate structure and solution for signaling UE capabilities that overcomes the deficiencies known from LTE, but that offers possibilities for a UE to report its best capabilities in an efficient manner.

According to particular embodiments, the network (e.g., a radio base station) requests a UE to send its UE capabilities to the network. The UE responds to the network with a message containing the UE capabilities. The network receives and analyzes the message, configures and allocates resources to the UE according to the received capabilities. Thus, the network sends configuration information to the UE. The UE receives the configuration information and uses the configuration information according to the received configuration message.

The UE structures the capability information as follows. The UE may construct information that groups the set of bands that it supports. The UE may also send a set of tables that each identify a set of base-band capabilities. Alternatively, the UE may send costs in terms of processing power describing the processing burden that it takes to execute a base-band functionality.

The UE also includes information that ties the bands and band groups to the tables of base-band capabilities. Thus, the UE Capability information message may identify groups of carriers that support different sets of base-band capabilities.

By this method, it is possible to enable a signaling structure by which a UE can, in a lean way, report its best capability to the network, for adequate performance.

In the example described above, a UE may: group f1 and f2 to Group 1; group f3 and f4 to Group 2; set baseband capability table 1 to 8×8 MIMO and NAICS supported; set baseband capability table 2 to 4×4 MIMO and NAICS not supported; and, the capability message or messages provide information about the groups shown above, the base-band capability tables, and information telling that Group 1 is capable of the information provided in Table 1, and Group 2 is capable of the information provided in Table 2.

Particular embodiments alleviate the combinatory problem seen in LTE using the present structure. Particular embodiments are able to scale even if the band combinations increase, which is not the case with known solutions.

Particular embodiments provide a set of said baseband capability tables and reference/use them from within several band combinations or from several groups within a band combination. Thus, compared to the LTE capability signaling, this structure avoids including the baseband capabilities directly into the band combinations (BC) and thereby it avoids duplicating all band combinations. And compared to the baseline solution agreed for NR, it does not require the UE to support all baseband features (and combinations thereof) across all its supported carriers and bands.

It should be recognized that there are many additional baseband capabilities, as discussed above, and that the UE may need to establish a significant number of groups to indicate all its capabilities.

The solution does not rule out that a UE could, for example, report multiple groups where a band, say f2, is present in several groups. For example, the structure permits a group to contain one entry (f2), or multiple entries of bands (f2 and f3), wherein f2 alone could be associated with one baseband capability, and f2 together with f3 could be associated with another table.

Particular embodiments may provide, from a UE to the network, a message that includes, for example, separate baseband capabilities for band1 compared to capabilities for band2, by: signaling a list of available bands and band-combinations or band combination groups; signaling a set of baseband capabilities, or costs in the UE for performing specific baseband features (e.g., MIMO, NAICS, etc.) in the form of cost credits; and signaling, per band group, an index to one of the sets of baseband capabilities, or cost within the group. Based on the signaling, the network will know, per band-combination, what particular baseband capability that is available for which group of bands within that band combination.

This is achieved without requiring explicit baseband capabilities per combination. If the cost-solution is used, the network can allocate and configure features until the maximum credits of the UE for a band or band group are exhausted.

According to some embodiments, a method of signaling device capabilities for use in a wireless device of a wireless communication network comprises compiling one or more frequency band combinations supported by the wireless device. Each frequency band combination comprises a plurality of frequency bands that the wireless device can use together for transmission or reception of wireless signals. The method further comprises compiling a set of device capabilities supported by the wireless device and assembling a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination.

The method further comprises sending the capability message to a network node. In some embodiments, the method includes receiving a device configuration from the network node. The device configuration comprises configuration according to one of the one or more frequency band combinations.

According to some embodiments, a wireless device is capable of signaling device capabilities. The wireless device comprises processing circuitry operable to compile one or more frequency band combinations supported by the wireless device. Each frequency band combination comprises a plurality of frequency bands that the wireless device can use together for transmission or reception of wireless signals. The processing circuitry is further operable to compile a set of device capabilities supported by the wireless device and assemble a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination. The processing circuitry is further operable to send the capability message to a network node. In some embodiments, the processing circuitry is further operable to receive a device configuration from the network node. The device configuration comprises configuration according to one of the one or more frequency band combinations.

In particular embodiments, for each band of the plurality of frequency bands, the indication of one of the one or more combinations of the device capabilities supported by the band when used in combination with the other bands in the frequency band combination comprises an indication of uplink device capabilities and an indication of downlink capabilities.

In particular embodiments, for each of the one or more frequency band combinations, the capability message includes a second indication of one or more device capabilities supported by the frequency band combination. The second indication of the one or more device capabilities supported by the frequency band combination comprises, for each band of the plurality of frequency bands, an indication of one of the one or more combinations of the device capabilities supported by the band when used in combination with the other bands in the frequency band combination.

In particular embodiments, each of the one or more combinations of the device capabilities is associated with an index, and the indication of one of the one or more combinations of the device capabilities supported by the band comprises the index of one of the one or more combinations of the device capabilities. The device capabilities include at least one of: bandwidth for the band; support for NAICS; number of MIMO layers supported; number of carriers supported in the band; number of carriers supported in the band for uplink; and number of carriers supported in the band for downlink.

In particular embodiments, the set of device capabilities includes a cost associated with each device capability. The cost representing an amount of device processing power required to perform the capability.

According to some embodiments, a method of signaling device capabilities for use in a network node of a wireless communication network comprises receiving, from a wireless device, a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination. The method further comprises determining a configuration for the wireless device based on the capability message. The method may comprise sending the determined configuration to the wireless device.

According to some embodiments, a network node is capable of signaling device capabilities. The network node comprising processing circuitry operable to receive, from a wireless device, a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination. The processing circuitry is further operable to determine a configuration for the wireless device based on the capability message. The processing circuitry may be further operable to send the determined configuration to the wireless device.

In particular embodiments, for each band of the plurality of frequency bands, the indication of one of the one or more combinations of the device capabilities supported by the band when used in combination with the other bands in the frequency band combination comprises an indication of uplink device capabilities and an indication of downlink capabilities.

In particular embodiments, for each of the one or more frequency band combinations, the capability message includes a second indication of one or more device capabilities supported by the frequency band combination. The second indication of the one or more device capabilities supported by the frequency band combination comprises, for each band of the plurality of frequency bands, an indication of one of the one or more combinations of the device capabilities supported by the band when used in combination with the other bands in the frequency band combination.

In particular embodiments, each of the one or more combinations of the device capabilities is associated with an index, and the indication of one of the one or more combinations of the device capabilities supported by the band comprises the index of one of the one or more combinations of the device capabilities. The device capabilities may include at least one of: bandwidth for the band; support for NAICS; number of MIMO layers supported; number of carriers supported in the band; number of carriers supported in the band for uplink; and number of carriers supported in the band for downlink.

In particular embodiments, the set of device capabilities includes a cost associated with each device capability. The cost represents an amount of device processing power required to perform the capability.

According to some embodiments, a wireless device is capable of signaling device capabilities. The wireless device comprises an obtaining module, an assembling module and a transmitting module. The obtaining module is operable to obtain, determine, and/or compile one or more frequency band combinations supported by the wireless device. Each frequency band combination comprises a plurality of frequency bands that the wireless device can use together for transmission or reception of wireless signals. The obtaining module is further operable to obtain, determine, and/or compile a set of device capabilities supported by the wireless device. The assembling module is operable to assemble a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination. The transmitting module is operable to send the capability message to a network node.

According to some embodiments, a network node is capable of signaling device capabilities. The network node comprises a receiving module and a determining module. The receiving module is operable to receive, from a wireless device, a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination. The determining module is operable to determine a configuration for the wireless device based on the capability message.

Also disclosed is a computer program product comprising a non-transitory computer readable medium storing computer readable program code, the computer readable program code operable, when executed by processing circuitry to perform any of the methods performed by the wireless device or network node described above.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

In a wireless communication network, such as Third Generation Partnership Project (3GPP) long term evolution (LTE) or fifth generation (5G) new radio (NR), a user equipment (UE) may signal its capabilities to a network node. The network node may use the capability information to configure the UE. Problems with existing solutions are that the capability information is too large and thus inefficient to signal, or the capability information does not adequately describe the capabilities of the UE.

Particular embodiments obviate the problem described above and include efficient and accurate signaling of UE capabilities. In general, a UE may signal a list of available bands and band-combinations or band combination group to a network node, such as an eNB or gNB. The UE may also signal a set of baseband capabilities, or costs in the UE for performing specific baseband features (e.g., MIMO, NAICS, etc.) in the form of cost credits. The UE signals, per band group, an index to one of the sets of baseband capabilities, or cost within the group. Based on the signaled information, the network knows, per band-combination, what particular baseband capability that is available for which group of bands within that band combination.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-7B of the drawings, like numerals being used for like and corresponding parts of the various drawings. LTE and 5G new radio (NR) are used throughout this disclosure as an example cellular system, but the ideas presented herein may apply to other wireless communication systems as well.

Figure 1:
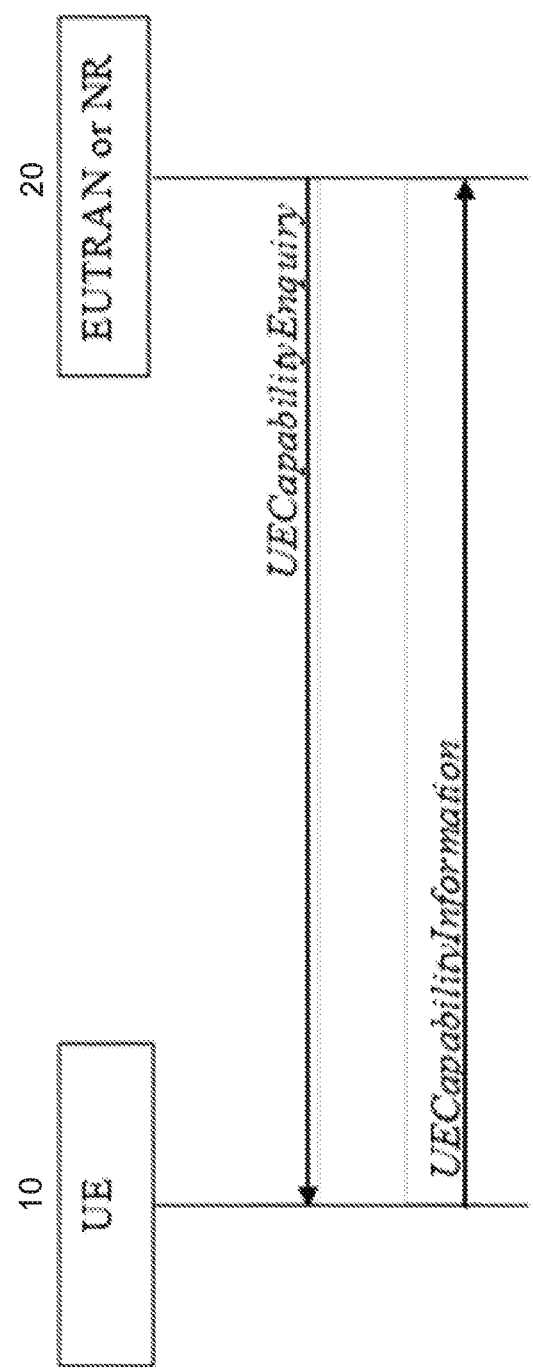
FIG. 1 is a sequence diagram illustrating an example of a user equipment (UE) signaling capability information to the network.
Figure 2:
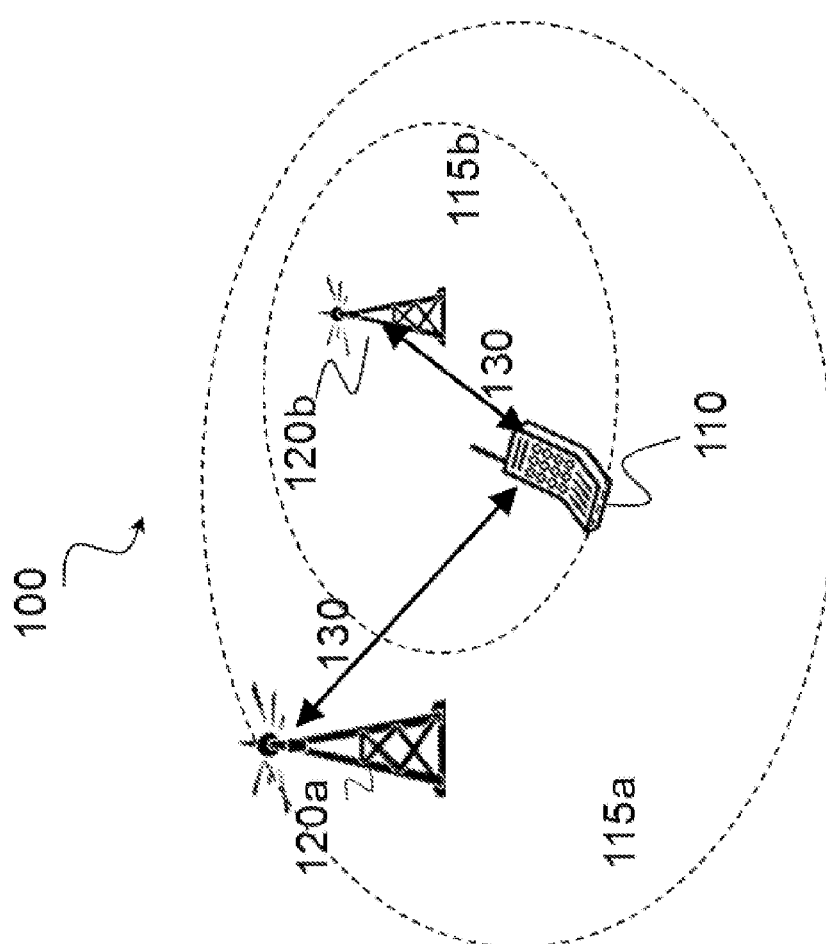
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multiple-input multiple-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots. Network node 120 may dynamically schedule subframes/slots/mini-slots as uplink, downlink, or a combination uplink and downlink. Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform selfscheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, wireless device 110 may signal to network node 120 what capabilities or combination of capabilities (e.g., MIMO, CA, etc.) that wireless device 110 supports. For example, wireless device 110 may compile one or more frequency band combinations (e.g., f1+f2; f3+f4; f1+f2+f3+f4) supported by wireless device 110. Each frequency band combination comprises a plurality of frequency bands that wireless device 110 can use together for transmission or reception of wireless signals. Herein, transmission or reception refers to transmission, reception, or both transmission and reception.

Wireless device 110 may compile a set of device capabilities (e.g., NAICS, MIMO, etc.) supported by the wireless device and assemble a capability message. The capability message includes the one or more frequency band combinations supported by wireless device 110 and one or more combinations of the device capabilities supported by wireless device 110. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination. Wireless device 110 may send the capability message to network node 120.

Network node 120 may receive, from wireless device 110, the capability message. Network node 120 may determine a configuration for wireless device 110 based on the capability message. Network node 120 may send the determined configuration to wireless device 110. Further details are described below and with respect to FIGS. 2-4.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 6A below. Similarly, a network node may include any suitable combination of hardware and/or software. For example, in particular embodiments, a network node, such as network node 120, may include the components described with respect to FIG. 7A below.

The baseline signaling used for NR assumes that the MIMO, CoMP (CSI) and NAICS processing is carrier and band agnostic. In other words, it assumes that the processing power of the UE can be applied to any of the carriers that might be configured in accordance with a band combination.

If the processing, however, is tied to a radio front-end, a single MIMO processing value may not be sufficient. In this case, a capability may indicate a "MIMO processing power" capability for several sets of bands (e.g., MIMO Processing Power Capability [Layers×Carriers]: Bands [A, B]: 4 Layers×Carriers; Bands [C, D]: 4 Layers×Carriers).

The capability may reflect a UE implementation where carriers on Band A and B are served by one RF (processor), and carriers on Band C and D are served by another RF (processor). If the network configures the UE with two carriers on Band C and D, it can use at most 2 layer MIMO for each. If the network configures one carrier on Band A and one carrier on Band C, the network may configure 2 layer MIMO for the former (because of the RF restriction on Band A) and 4 layer MIMO for Band C.

If UEs advertising cumulative processing capabilities available for all bands is too restrictive, the UE may indicate cumulative MIMO-Processing-Capability for sets of (one or more) bands. However, consideration must be given to cases where RFs support (partly) overlapping bands, such as RF1=[A, B, C]:[4Layer], RF2=[C, D]:[4Layer].

The network, when configuring the UE with one carrier on Band C and one on Band D, may assume that the UE picks the RFs that maximize the available processing capabilities. If so, the network may configure 4 Layers on Band C and additionally 4 Layers on Band D.

If the network configures 2 carriers on Band C and 1 carrier on Band D, the network could configure 4 Layers for one of the carriers on Band C but only 2 layers for the other carrier on band C and 2 Layers for the carrier on Band D. A question is which of the 2 carriers on Band C may be configured with 4 layer MIMO. One option is the RF2 may serve the carrier on Band C that is closer (in frequency domain) to the carrier on Band D. Another question is whether the UE also supports a configuration where both carriers on Band C with 2 layers each are served by RF1 and where the carrier on Band D is operated with 4 Layers by RF2. One option is that the network assumes that the UE uses a common carrier (of RF1) to serve the two carriers of Band C if they are continuous but separate RFs when they are not.

The LTE band combination capability signaling does not refer directly to carriers, but rather only to bands. In addition, it advertises BandwithCombinations, i.e. the number of contiguous carriers that it could serve in this band.

However, for a specific intra-band contiguous band combination (e.g., Class C (=2 carriers)) an LTE wireless device cannot indicate that it supports 2 MIMO layers on one and 4 MIMO layers on the other carrier. Additionally, the LTE wireless device cannot advertise on which of the two carriers it supports what functionality. Accordingly, some embodiments do not aim to make the NR capability signaling even more flexible and generic than the LTE signaling was. Particular embodiments focus on reducing the size and complexity of the capability structure.

The following shows an example where a UE may indicate its overall processing limits (entirely independent of any carriers, bands and RFs) and in addition indicate limits per bands in a band-combination.

From the description above, it appears the RF structure indicating what bands are covered by which RF is not sufficient as the network cannot map the band to carriers if one band can be covered by two RFs. One option may be for specifications to indicate particular UE implementations regarding allocating carriers/different tasks to different RFs. Another option is that the network assumes the worst case. An example is illustrated in FIG. 3.

Figure 3:
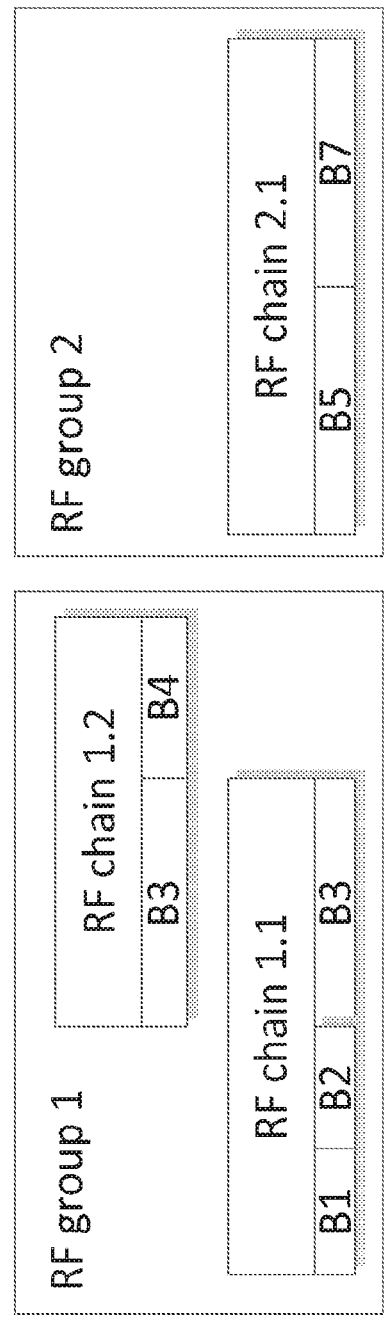
FIG. 3 is a block diagram illustrating an example of a UE with multiple radio frequency (RF) groups and radio chains.

FIG. 3 is a block diagram illustrating an example of a UE with multiple radio frequency (RF) groups and radio chains. The UE includes a LTE RF structure comprising groups and chains. The UE has three RF chains. Chain 1.2 can service bands B3 and B4, while chain 1.1 can service B1, B2, and B3. Note that B3 could be serviced with either chain 1.2 or 1.1. Chain 2.1 services any carrier frequencies from bands B5 and/or B7.

An NR solution described in the Introduction above assumes that the UE can support the advertised baseband features (either in a table or by a formula) on any of the carriers that might be configured in accordance with a band combination.

However, if a processor is tied to a particular radio front-end, the baseband capabilities supported by that processor may not be available to other bands. To address this limitation, one solution is to split the baseband capabilities and indicate in the band combination table which capability restriction applies to which sets of bands. It could be realized both for a table-based and the formula-based baseband capability signaling as exemplified in the following.

As explained above, a baseband capability table allows the network to pick a suitable set of baseband features depending on the configured number (and possibly bandwidth) of carriers. If such sets of baseband features are only available for a subset of the bands/carriers of a band combination, the table must instead (or in addition) be associated with that set of bands inside the band combination.

The following example assumes that the UE includes only the top-level band combinations and omits all fallback band combinations. The structure of a band combination facilitates indicating multiple uplink band combinations for one downlink band combination. The uplink band combinations are the top-level band combinations, whereas fallback band combinations are omitted.

| Example: Baseband-Capability tables for sets of bands |
|---|

```
DL-BandCombinationList = [
    bandsDL = [BandX, BandY,       BandZ]
    bwClassesDL = [C,A,A]                           // up to 2
CCs on Band X; up to 1 on Y and Z
    bwClassesListUL = [
        [A,—,—],                                    // ... with
one UL CC on band X, or
        [—,A,—],                                    // ... with
one UL CC on band Y, or
        [—,—,A]                                     // ... with
one UL CC on band Z
    ]
    basebandCapabilties = [
        bandGroup                   = [1,0,0]       // carriers
on band X share ...
        basebandCapabiltiyTable = 2                 //      the
baseband capabilities according to table 2
    ], [
        bandGroup                   = [0,1,1]       // carriers
on band Y and Z share ...
        basebandCapabiltiyTable = 2                 //      the
baseband capabilities according to table 2
    ]
], [
    bandsDL = [BandK, BandL]
    bwClassesDL = [A,D]                             // 1 CC on
Band K; up to 3 (contiguous) on L
    bwClassesListUL = [
        [A,—] ,                                     // ...
with an UL CC on band K
    ]
    basebandCapabilties = [
        bandGroup                   = [1,0]         //
Carriers on band K may use ...
        basebandCapabiltiyTable = 2                 //      the
baseband capabilities according to table 2
    ], [
        bandGroup                   = [0,1]         //
carriers on band L share ...
        basebandCapabiltiyTable = 1                 //      the
baseband capabilities according to table 1
    ]
]
basebandCapabilityTableList = [
    Table1 = [
        nrofCarriers                = 3
        maxBandwidth                = 80MHz
        mimoLayers                  = 4
        NAICS                       = 0MHz
    ]
    Table2 = [
        nrofCarriers                = 2
        totalBandwidth              = 40Mhz
```

| Example: Baseband-Capability tables for sets of bands | |
|---|---|
|     mimoLayers | = 2 |
|     NAICS | = 0MHz |
| ], [ | |
|     nrofCarriers | = 1 |
|     totalBandwidth | = 20MHz |
|     mimoLayers | = 4 |
|     NAICS | = 0MHz |
| ] ,[ | |
|     nrofCarriers | = 1 |
|     totalBandwidth | = 20MHz |
|     mimoLayers | = 2 |
|     NAICS | = 20MHz |
| ] | |
| ] | |

As seen from the example above, the UE signals the following information to the network:

The UE advertises two band combinations, wherein a first band combination contains downlink bands [BandX, BandY, and BandZ] and the second band combination contains downlink bands [BandK, BandL].

When configured with downlink carriers in accordance with the first band combination, the UE is capable of having one uplink carrier on any of the bands in the first band combination.

When configured with downlink carriers in accordance with the second band combination, the UE is capable of having one uplink carrier on BandK.

Within each band combination the UE defines band groups. In the first band combination the first band group comprises BandX and the second band group comprises BandY and BandZ. In the second band combination, the first band group comprises BandK and the second band group comprises BandL.

The UE further defines two baseband capability tables. The first table includes one set of baseband capabilities. The second table includes three sets of baseband capabilities where the sets are further specifying different combinations of base-band capabilities. For example, the two of the sets both relate to maximum one carrier of 20 MHz, but the UE can either handle NAICS with 2 layer MIMO, or alternatively no NAICS but 4 layer MIMO.

The UE then ties the band groups to baseband capability tables.

This particular format of signaling is just one way of realizing particular embodiments. For example, connecting the tables to the band groups could be done with various ways of numbering or indexing the information. For example, some embodiments assign the bands and/or band-combinations an index, and the baseband capability tables another index. Those indexes may be tied together with bitmaps or other signaling.

In particular embodiments, the capability information is explicitly signaled, but the standard specification includes a sufficiently large set of various alternative base-band capabilities (i.e., sets or "tables" capabilities) that the UE can point to for the various bands and/or band groups. This would reduce the signaling, because the table information would not be conveyed over the air-interface, just an index or pointer or reference to the table in the specification.

The description of particular embodiments uses the word "Table" to denote information arranged to describe e.g. baseband capabilities. The information does not have to be represented by a table as such. It can be arranged and signaled in any format or signaling structure, as long as it describes a set of baseband capabilities in an adequate way. Such a table may be described using an ASN.1 message structure in a signaling protocol such as the radio resource control (RRC) protocol. For NR, the specification is numbered 38.331.

Some embodiments may use a formula and a UE may advertise processing capabilities and costs per sets of carriers as described in the following examples. In these embodiments, the UE signals how many processing "credits" it takes to perform a certain function. For example, a UE may have 1000 credits for processing for a particular group of bands. The UE informs, through its capability information, how many credits it takes to perform e.g. 8×8 MIMO on a particular group (say 250), or 100 for 4×4, etc., and how many NAICS credits it would use for the same group, etc.

The network can configure functions on that group of carriers as long as the credit limit (1000) is not exhausted. This facilitates a flexible approach for signaling capabilities, and for the network to decide on what combinations of carriers and resources to allocate from a band group. The credit limit may be a fixed value, set in the specifications, or explicitly signaled in the UE capability information message sent from the UE to the network.

| UE capabiliy cost function - Example ASN.1 | | | |
|---|---|---|---|
| BandCombinationList | ::= | SEQUENCE | (SIZE (1..maxSimultaneousBandCombinations)) OF Bandcombination |
| BandCombination ::= SEQUENCE { | | | |
|     bandsDL | | SEQUENCE | (SIZE (1..maxSimultaneousBands-r10)) |
| | OF FreqBandIndicator | | |
|     BandCombinationVariantList | | SEQUENCE | (SIZE (1..maxBC-Variants) OF BandCombinationVariant, |
| } | | | |
| BandCombinationVariant | ::= SEQUENCE { | | |

| UE capabiliy cost function - Example ASN.1 |
| --- |
| ```
    bwClassesDL              SEQUENCE           (SIZE
(1..maxSimultaneousBands)) OF CA-BandwidthClass-DL
    bwClassesListUL          SEQUENCE           (SIZE
(1..maxBwClassesPerBandCombination) OF BwClassesUL
        processingLimitListDL    SEQUENCE       (SIZE
(1..maxProcessingLimits) OF ProcessingLimitListDL
}
BwClassesUL         ::=  SEQUENCE  (SIZE  (1..maxSimultaneousBands))
OF CA-BandwidthClass-UL
ProcessingLimitListDL    ::=   SEQUENCE                       {SIZE
(1..maxProcessingLimits) OF ProcessingLimitDL
ProcessingLimitDL ::= SEQUENCE {
    bandGroup                BITSTRING          (SIZE
(1..maxSimultaneousBands)),
        processingLimitValue     INTGEGER (0..65535)
}
--
...
ueProcessingLimit              INTGEGER(0..65535)       OPTIONAL,
processingCostMIMO         ::= SEQUENCE {
    ueProcCostMIMO-DL-2LayerPerCC
    INTGEGER(0..65535 )      OPTIONAL,
    ueProcCostMIMO-DL-4LayerPerCC
    INTGEGER(0..65535 )      OPTIONAL,
    ueProcCostMIMO-UL-2LayerPerCC
    INTGEGER(0..65535)       OPTIONAL,
    ueProcCostMIMO-UL-4LayerPerCC
    INTGEGER(0..65535)       OPTIONAL,
    bandGroupProcCostMIMO-DL-2LayerPerCC
    INTGEGER(0..65535)       OPTIONAL,
    bandGroupProcCostMIMO-DL-4LayerPerCC
    INTGEGER(0..65535)       OPTIONAL,
    bandGroupProcCostMIMO-UL-2LayerPerCC
    INTGEGER(0..65535)       OPTIONAL,
    bandGroupProcCostMIMO-UL-4LayerPerCC
    INTGEGER(0..65535)       OPTIONAL
}
processingCostCSI           ::=   SEQUENCE {
    ueProcCostCSI-perProcess
    INTGEGER(0..65535)       OPTIONAL,
    bandGroupProcCostCSI-perProcess
    INTGEGER(0..65535)       OPTIONAL
}
processinqCostNaicsPerPhysicalResourceBlock      ::=   SEQUENCE
{
    ueProcCostNAICS-perPRB
    INTGEGER(0..65535)       OPTIONAL,
    bandGroupProcCostNAICS-perPRB
    INTGEGER(0..65535)       OPTIONAL
}
...
``` |

| UE capability cost function - Example Capabilities Signaling from a UE to the network |
| --- |
| ```
DL-BandCombinationList = [
  bandsDL = [BandX, BandY, BandZ]
  BandCombinationVariantList = [
    bwClassesDL = [C,A,A]                        // up to
3 CCs on Band X; up to 1 on Y and Z
    bwClassesListUL = [
      [A,-,-],                                    // ...
with one UL CC on band X, or
      [-,A,- ],                                   // ...
with one UL CC on band Y, or
      [-,-,A]                                     // ...
with one UL CC on band Z
    ]
    processingLimitListDL = [
      bandGroup                = [1,0,0] //
carriers on band X share ...
        bandGroupProcLimit = 500              // proc.
capabilities of 500
    ], [
      bandGroup                = [0,1,1] //
carriers on band Y and Z share ...
        bandGroupProcLimit      = 800             //
proc. capabilities of 800
    ],
    bwClassesDL = [A,A,C]                        // up to
1 carrier on Band X and Y; up to 3 on Z
    bwClassesListUL = [
      [A,-,-],
      [-,A,-],
      [-,-,C]
    ]
    processingLimitListDL = [
      bandGroup                = [1,1,0] //
carriers on band X and Y share ...
        bandGroupProcLimit      = 500             //
proc. capabilities of 500
    ], [
``` |

UE capability cost function - Example Capabilities
Signaling from a UE to the network

```
        bandGroup                = [0,0,1] //
carriers on band z share ...
        bandGroupProcLimit    = 800        //
proc. capabilities of 800
    ]
   ]
], [
    bandsDL = [BandW, BandX]
    BandCombinationVariantList = [
        bwClassesDL = [C,C]              // up to 3
carriers on Band W; up to 3 X
        bwClassesListUL = [
            [A,-],
            [-,A]
        ]
        processingLimitListDL = [ ]      // only per-
UE processing limits apply.
    ]
]
ueProcessingLimit = 2000
processingCostMIMO = [
  -,
  -,
  -,
  -,
  200,
  400,
  -,
  -
]
processingCostCSI = [
  300,
  -
]
processingCostNaicsPerPhysicalResourceBlock = [
  2,
  2
]
```

In the example above, the UE signals two band combinations (one with BandX, BandY, BandZ and one with BandW, BandX). For the first band combination, the UE advertises two different band combination variants which differ in the number of carriers that the UE supports in each of the bands. For the second band combination, the UE advertises only one band combination variant.

For each band combination variant, the UE indicates the configurable uplink bands/carriers that the NW may configure. And it may define band groups like in the previous example. Unlike the previous example, the UE provides a processing limit for the band group (bandGroupProcLimit).

In the present example, the first variant of the first band combination define a band group of BandY and BandZ which share the same baseband processing capability, while the processing capability for BandX processing is independent from the baseband capability of Band Y and Band Z. The credits are 800 and 500, respectively. Here, it is assumed that the credit limit is signalled. However, it is also possible that the credit is a fixed value, and the relative cost is then given in terms of the baseband function. It can also be seen that the last group [BandW, BandX] is not having any separate credit, but it relies on a total credit (or limit) of 2000 credits.

The UE may provide cost information indicating how many credits are required to perform e.g. MIMO on a processor. This could be realized as a message that carries a sequence of values for e.g. [transmit diversity, 2×2, 4×4, 8×8 . . . ]. Configuring e.g. 8×8 MIMO could then cost e.g. 400 credits, which would mean that only limited number of additional functions can be configured on a band-combination that has advertised e.g. 500 credits.

It should be noted that in another embodiment the band groups could, as in the embodiment outlined before, be defined directly in the band combination (i.e., it could be used without "band combination variants").

Particular embodiments may list all band combinations explicitly and the UE may report its supported band combinations by a bitmap (each bit represents one band combination in the table). However, such lists may become long and thus, the UE would have to signal correspondingly long bitmaps. Particular embodiments assume that a UE supporting aggregation of many carriers will also support the fallback combinations. If those are omitted (as already done in LTE Rel-13) and if the baseband/processing capabilities are separated from the RF capabilities, explicit signaling of band numbers in the CA Band Combination IE may be more efficient than a bitmap.

When omitting fallback band combinations and when splitting RF from processing capabilities, the number of signalled band combination entries becomes small compared to the total number of defined band combinations. Thus, it may be more efficient to signal band numbers explicitly in the band combination IE (instead of referring to an index).

As elaborated above, LTE UEs duplicate band combination entries to offer the downlink carrier aggregation configuration in combination with different uplink carrier configurations. The UE advertises only the top level band combination which decreases the band combinations that a UE advertises. Furthermore, particular embodiments include a list of supported uplink band combination into the (top-level) downlink band combination rather than duplicating the entire band combination. This avoids duplicating the band numbers and other downlink related capabilities.

The UE may advertise several uplink band combinations (several lists of uplink BandwidthClasses) in a single downlink band combination instead of duplicating the entire downlink band combination.

Particular embodiments include capability signaling for measurement gaps. In LTE, the UE indicates as part of the band combination entry whether it requires gaps to perform measurements on carriers of certain bands. In other words, there is a bitmap in each band combination wherein each bit identifies a target band to be measured. Considering the large number of band combination entries that an LTE UE conveys in its capabilities, the overhead due to the additional bitmaps is significant.

If a future specification defines a solution to reduce the number of listed band combinations (e.g., by listing only the top-level band combinations explicitly), including the bitmaps may be more acceptable. However, the UE may need to indicate the "needForGaps" taking the worst case configuration (top level band combination) into account. Those configurations would likely require gaps for any inter-carrier measurement, i.e., it would likely indicate for all bands that it does need gaps.

Particular embodiments, therefore, include the possibility of replacing the expensive explicit signaling by a set of rules based on which the network may determine in which carrier configuration a UE is able to perform measurements without gaps. Even if this results in a few occasions where the network configures gaps even though the UE could have performed the measurements without, this may be acceptable considering that inter-frequency measurements and gaps are typically configured only if a UE is about to leave the serving carrier or to test inter-frequency load balancing.

At other times, UEs operate without gaps. Even when a UE is configured with measurement gaps, this does not impact the end to end performance of the UE if the network also has other UEs to schedule, and if the network can offset the gaps so that the network can schedule another UE while a first UE has a measurement gap.

The following lists a number of observations and proposals for defining rules based on which the network may determine the UE's "needForGaps" without costly signaling. For aggregation of "Continuous Carriers" most UEs use a single RF. Thus, inter-frequency measurements on non-serving carriers in the same band cause glitches if the carrier could be configured as serving cell or require gaps otherwise. The network assumes that the UE needs gaps to measure carriers that are continuous with the configured serving cell even if that additional carrier could be configured as additional serving cell. Inter-Frequency and Inter-RAT measurements performed by an additional, currently unused RF (radio front-end) can be performed without gaps and glitches. UEs perform Inter-Band (and Intra-Band-Non-Contiguous?) carrier aggregation by separate RFs.

Note that this assumes basically that a UE can only perform gap-less measurements on carriers that it could use as SCell. The NW assumes that the UE does not require measurement gaps or glitches for measurements on an inter-band (or intra-band-non-contiguous) carrier that could be configured as additional serving cell (in addition to the UE's current configuration).

An LTE or UMTS network performs Radio Resource Management (RRM) and configures UEs in a way that maximizes performance (throughput, data rate, latency, energy consumption, etc.) both from system and end-user perspective. To do so, the network needs to be aware of the capabilities of each UE.

In LTE, the UE is not able to change its capabilities (except by transition through DETACH/ATTACH). This principle avoids additional signaling but, more importantly, it suits the design choice that Radio Resource Management (RRM) is performed by one entity only, i.e., by the network.

To perform this task, the network maintains an overall view of the network, of the connected UEs, their radio conditions and their capabilities. If a UE was able to adjust its capabilities (e.g., by indicating or withdrawing support for certain bands), it would turn into a negotiation between network and UE, which would increase Uu signaling load and may counteract RRM actions initiated by the network.

The complete set of UE capabilities may be static, i.e., the UE may not change its capabilities except during DETACH/ATTACH (this should not preclude enhancements such as e.g. network-requested capabilities)

A UE cannot fulfil its "usual" capabilities in certain situations. Those could be temporary problems such as an overheating CPU, which could to some extent be handled internally in the UE by temporary dropping of performance. But it could also be due to the desire to share a radio front-end or other components with another radio access technology (RAT) (e.g., Wi-Fi). While the former would likely be a rare event, the latter could appear often and possibly change quite dynamically. While some embodiments may include general means to (temporarily) deviate from the UE capabilities, particular embodiments include restrictions to avoid unbearable signaling and processing load (frequent reconfigurations), poor RRM performance and poor network key performance indicators (KPIs). Thus, particular embodiments may prohibit changes to UE capabilities by means of timers. For example. the UE may be allowed to down-grade its capabilities to a sub-set of its overall capabilities. A subsequent upgrade may be prohibited by a timer. Such an approach avoids unwanted interactions with network side RRM and follows similar principles as the Power Preference Indicator in LTE.

In LTE, the concept of In-Device Coexistence (IDC) has been used to indicate certain limitations and restrictions due to radio problems caused by interference from adjacent carriers (e.g., Wi-Fi and Band 40). But it was later also allowed to be used for indicating problems when LTE-LAA and Wi-Fi were sharing a radio front-end. Instead of such a scheme, particular embodiments may merge such functionality into the capability signaling framework (e.g., indicate that temporarily a certain Band or Band Combination may not be used). While this may be useful for a shared RF (Wi-Fi and NR in 5 GHz), it seems less appropriate for cases where e.g. only a subset of the carriers in a band are currently unusable (if e.g. only the upper 40 MHz in Band 40 being interfered by a Wi-Fi operating in the adjacent ISM band).

NR supports means by which a UE may indicate (temporary) restrictions of its capabilities to account e.g. for an overloaded/overheated CPU or constraints due to other active RATs. Particular embodiments do not harm the user and network performance and stability.

As baseline, the UE may indicate (temporary) restrictions of its full set of capabilities. It may revert to a super-set of these restricted capabilities only after expiry of a prohibit timer configured by the network. The capabilities which the UE may restrict may be specified explicitly in a specification.

A UE may have means to indicate temporary restrictions of its capabilities to the network. The following considerations may influence particular embodiments in NR capabilities design: (a) hardware sharing between NR and other technologies, e.g. WLAN, BT, GPS, etc.; (b) interference between NR and other technologies, e.g. WLAN, BT, GPS, etc.; (c) exceptional UE issues (e.g., overheating problems); (d) the UE radio access capabilities are static and the change is to temporarily (e.g., under network control) limit the availability of some capabilities, e.g. due to hardware sharing, interference or overheating; (e) the temporary capability restriction may be transparent to the NG core, i.e. only static capability is stored in the NG core; and (f) the UE signals the temporary capability restriction request to the gNB.

| | |
|---|---|
| UE-EUTRA-Capability ::= | SEQUENCE { |
| accessStratumRelease AccessStratumRelease, | |
| ue-Category (1..5), | INTEGER |
| pdcp-Parameters | PDCP-Parameters, |
| phyLayerParameters PhyLayerParameters, | |
| rf-Parameters | RF-Parameters, |

-continued

| | |
|---|---|
| measParameters | MeasParameters, |
| featureGroupIndicators (32)) OPTIONAL, | BIT STRING (SIZE |
| interRAT-Parameters | SEQUENCE { |
| utraFDD ParametersUTRA-FDD OPTIONAL, | IRAT- |
| utraTDD128 ParametersUTRA-TDD128 OPTIONAL, | IRAT- |
| utraTDD384 ParametersUTRA-TDD384 OPTIONAL, | IRAT- |
| utraTDD768 ParametersUTRA-TDD768 OPTIONAL, | IRAT- |
| geran ParametersGERAN OPTIONAL, | IRAT- |
| cdma2000-HRPD ParametersCDMA2000-HRPD OPTIONAL, | IRAT- |
| cdma2000-1xRTT ParametersCDMA2000-1XRTT OPTIONAL }, | IRAT- |
| nonCriticalExtension Capability-v920-IEs OPTIONAL } | UE-EUTRA- |

A separate IE containing the LTE/NR Band Combinations (BC) explicitly may allow UEs to reflect their capabilities more accurately (compared to a matrix linking LTE and NR band combinations).

For band combinations, indexing may be used for two purposes. First, an index may be used for band-combination linking. Instead of defining a list of "EN-DC band combination" elements in capability signaling that explicitly define LTE and NR bands, a matrix may link an "LTE band combination" with an "NR band combination." To link via a matrix, each LTE-BC and each NR-BC is associated with an index.

A second purpose uses an index for abstracting another DC node's current configurations. In LTE DC, both nodes may comprehend the configuration of the other cell group to determine which (additional) configuration is possible for its own cell group. To avoid that, for the LTE and NR nodes to comprehend each other's configuration, they could list the band combinations (and possibly other capability combinations) that are still (or not) available for the other node. This could also be done by a list of band combination indexes.

A disadvantage of the first indexing purpose is that that both nodes should at least be able to comprehend the frequencies of the band combinations that the UE supports (so that the LTE MeNB can determine whether the UE supports an LTE+NR BC which fits to its NW configuration). In addition, it may be useful that the nodes can assess which band combination would maximize the overall performance.

Furthermore, linking LTE-BCs to NR-BCs by means of an index increases the overhead because of the additional matrix and/or index numbers. It is also likely that none of the existing LTE BC will be linkable to any NR BC, i.e., UEs will likely include additional (fallback) LTE-BCs and link only those to the NR BCs.

With a particular matrix, the UE would indicate which LTE band combinations may be configured in combination with which NR band combinations. This appears attractive because the UE anyway lists its band combinations for single radio access technology (RAT) operation. Thus, the only overhead is the matrix. However, if LTE and NR share RF or baseband components in the UE, the band combination entries applicable for single-RAT operation will likely not be applicable for dual-connectivity mode. This applies in particular also for the interFreqNeedForGaps, which is likely affected if the UE is additionally configured with an NR carrier. Thus, the UE may include additional "LTE fallback band combination" only for the purpose of linking them to NR band combinations and vice versa.

A UE sharing RF and/or baseband components between NR and LTE may include additional "LTE fallback band combination" for the purpose of linking them to NR band combinations and vice versa. Furthermore, connecting NR band combinations with LTE band combinations by means of a matrix bears the risk of propagating the current capability signaling problems to NR. In particular, it may be likely that a UE lists all "NR fallback band combinations" explicitly to combine them with different LTE band combinations. A matrix of LTE- and NR Band Combinations bears the risk that UEs advertise all NR (and LTE) fallback band combinations explicitly.

Particular embodiments may include a new and leaner capability signaling also for LTE. In some embodiments, a dedicated IE containing the LTE+NR band combinations comprises a lean capability signaling (e.g., listing only top-level band combinations; separating baseband from RF capabilities; cost function to express dependencies of processing-heavy features; etc.) also for LTE. A dedicated IE containing the LTE+NR band combinations may facilitate a leaner capability signaling also in LTE.

Furthermore, the per-RAT capabilities (e.g., UE-EUTRA-Capability, UE-NR-Capability) may contain features that are only applicable or meaningful when that RAT is the master (e.g., interRAT-Parameters, positioning related capabilities, CSG, WLAN interworking, LTE-DC, etc.). Some features a UE may only support when in single-RAT mode (e.g., MBMS, sidelink, extended coverage, etc.). If those capability parameters are not included in the band combination, signaling may include additional fields to indicate those constraints. If the fields are in the band combination, it may lead to additional duplication of band combination entries in the RATs. Accordingly, the capability matrix approach for LTE/NR Dual Connectivity may not be optimal.

Particular embodiments may include capabilities for LTE/NR Dual Connectivity in the UE-EUTRA-Capability IE when LTE is the Master. In particular, some embodiments add the NR bands to the LTE band combination entries.

To avoid specifying the capability fields and IEs in two specifications, particular embodiments specify NR related capabilities in the 3GPP 38-series and use them as transparent containers in the LTE capabilities.

UE-EUTRA-Capabilities for Rel-15 may contain an IE collecting per-UE capabilities applicable when EUTRA-NR DC is configured. The IE may contain LTE specific parameters and (primarily) an OCTET STRING with an IE from the NR specification.

```
-- ASN1START
UE-EUTRA-Capability-v15xy-IEs ::= SEQUENCE {
    lteNrDualConnectivity            ENDC-Capabilities-v15xy        OPTIONAL,
    nonCriticalExtension            SEQUENCE { }        OPTIONAL
}
...
ENDC-DC-Capabilities-v15xy SEQUENCE {
    eutra-specific-Capabilities SEQUENCE {
    -- EUTRA capabilities applicable when configured with LTE-NR DC (if any)
    },
```

```
    nr-specific-Capablities        OCTET STRING
(CONTAINING UE-ENDC-NR-Capability-Container-15xy)
                                  OPTIONAL
}
```

UE-NR-Capabilities for Rel-15 may contain IEs collecting NR capabilities applicable when EUTRA-NR DC is configured.

```
UE-ENDC-NR-Capability-Container-15xy ::=    SEQUENCE {
    pdcp-Parameters                 PDCP-Parameters,
    phyLayerParameters              PhyLayerParameters,
    rf-Parameters                   RF-Parameters,
    ...
}
```

EUTRA Band Combination Parameters may include NR bands for EN-DC.

```
BandCombinationParameters-r13 ::= SEQUENCE {
    differentFallbackSupported-r13           ENUMERATED {true}
        OPTIONAL,
    bandParameterList-r13                    SEQUENCE (SIZE
(1..maxSimultaneousBands-r10) ) OF
        BandParameters-r13,
    supportedBandwidthCombinationSet-r13
    SupportedBandwidthCombinationSet-r10              OPTIONAL,
    multipleTimingAdvance-r13                ENUMERATED {supported}
        OPTIONAL,
simultaneousRx-Tx-r13                        ENUMERATED {supported}
        OPTIONAL,
    bandInfoEUTRA-r13                        BandInfoEUTRA,
    dc-Support-r13                           SEQUENCE {
        asynchronous-r13                     ENUMERATED {supported}
            OPTIONAL,
        supportedCellGrouping-r13            CHOICE {
            threeEntries-r13                 BIT
STRING (SIZE(3) ),
            fourEntries-r13
    BIT STRING (SIZE (7) ),
            fiveEntries-r13
    BIT STRING (SIZE(15) )
        }
                                             OPTIONAL
    }
                                             OPTIONAL,
    supportedNAICS-2CRS-AP-r13               BIT STRING (SIZE
(1..maxNAICS-Entries-r12) ) OPTIONAL,
    commSupportedBandsPerBC-r13              BIT STRING (SIZE (1..
maxBands) )             OPTIONAL
}
BandParameters-rlS ::= SEQUENCE {
    CHOICE {
        bandEUTRA           BandParameters-r13,
        bandNR              OCTET STRING (CONTAINING NR-BandParameters)
    }
}
BandParameters-r13 ::= SEQUENCE {
    bandEUTRA-r13                            FreqBandIndicator-r11,
    bandParametersUL-r13                     BandParametersUL-r13
        OPTIONAL,
    bandParametersDL-r13                     BandParametersDL-r13
        OPTIONAL,
    supportedCSI-Proc-r13                    ENUMERATED {n1, n3, n4}
        OPTIONAL
}
BandParametersUL-r13 ::= CA-MIMO-ParametersUL-r10
CA-MIMO-ParametersUL-r10 ::= SEQUENCE {
    ca-BandwidthClassUL-r10                  CA-BandwidthClass-r10,
```

| EUTRA Band Combination Parameters may include NR bands for EN-DC. |
| --- |
| supportedMIMO-CapabilityUL-r10            MIMO-CapabilityUL-r10                              OPTIONAL<br>}<br>BandParametersDL-F13 ::= CA-MIMO-ParametersDL-r13<br>CA-MIMO-ParametersDL-r13 ::= SEQUENCE {<br>   ca-BandwidthClassDL-r13                   CA-BandwidthClass-r10,<br>   supportedMIMO-CapabilityDL-r13            MIMO-CapabilityDL-r10            OPTIONAL,<br>   fourLayerTM3-TM4-r13<br>     ENUMERATED {supported}                  OPTIONAL,<br>   intraBandContiguousCC-Infolist-r13        SEQUENCE (SIZE<br>(1..maxServCell-r13) ) OF<br>   IntraBandContiquousCC-Info-r12<br>} |

Particular embodiments may distinguish standalone from non-standalone NR operation. In particular embodiments, a UE includes the traditional EUTRA UE capabilities, the new NR UE capability structure and a "matrix" combining the two. However, at least initial UEs will not actually support NR standalone operation. At least that information is conveyed in the inter-RAT IEs inside the LTE capabilities so that the LTE network knows whether or not it may handover the UE to NR or use it only in DC mode.

| UE-EUTRA-Capability information element |
| --- |
| -- ASN1START<br>UE-EUTRA-Capability ::=                       SEQUENCE {<br>   accessStratumRelease                       AccessStratumRelease,<br>   ue-Cateqory                                INTEGER (1..5),<br>   pdcp-Parameters                            PDCP-Parameters,<br>   phyLayerParameters                         PhyLayerParameters,<br>   rf-Parameters                              RF-Parameters,<br>   measParameters                             MeasParameters,<br>   featureGroupIndicators                     BIT STRING (SIZE (32))    OPTIONAL,<br>   interRAT-Parameters                        SEQUENCE {<br>     utraFDD                                  IRAT-ParametersUTRA-FDD     OPTIONAL,<br>     utraTDD128                               IRAT-ParametersUTRA-TDD128  OPTIONAL,<br>     utraTDD384                               IRAT-ParametersUTRA-TDD384  OPTIONAL,<br>     utraTDD768                               IRAT-ParametersUTRA-TDD768  OPTIONAL,<br>     geran                                    IRAT-ParametersGERAN        OPTIONAL,<br>     cdma2000-HRPD                            IRAT-ParametersCDMA2000-HRPD   OPTIONAL,<br>     cdma2000-1xRTT                           IRAT-ParametersCDMA2000-1XRTT  OPTIONAL<br>   },<br>   nonCriticalExtension                       UE-EUTRA-Capability-v920-IEs     OPTIONAL<br>}<br>... |

A UE not supporting NR in standalone mode may not list "NR" in the interRAT-Parameters. However, the list is also referred to from within the measParameters (InterRAT-BandList→InterRAT-BandInfo→interRAT-NeedForGaps) to indicate whether the UE requires gaps to measure the NR bands (including the case when LTE/NR DC is not yet configured). Thus, even UEs not supporting standalone NR (on all their NR carriers) should list the NR bands in the interRAT-Parameters. UEs indicate in UE-EUTRA-Capability→interRAT-Parameters→IRAT-ParametersNR which NR bands they support and whether they support NR in standalone mode.

In particular embodiments, a MeNB may indicate maximumConfiguration to SgNB. In LTE DC, the MeNB and SgNB comprehend the UE capabilities and the UE configuration. Both nodes may pick a configuration (of the MCG and SCG side) that does not exceed the UE capabilities. To avoid race conditions (e.g., SgNB and MeNB simultaneously pick a "bigger" configuration so that the combination of the two new configurations exceeds the UE capabilities), the MeNB is the gatekeeper that verifies the combined configuration before forwarding it to the UE.

In LTE/NR interworking, the two nodes may not be able to comprehend the other RAT's capabilities or configuration. As described above, "feature combination sets" (e.g., band combination entries) of both RATs may be numbered and referred to in a matrix or list. When a network node (e.g., MeNB) picks a new configuration for the UE (e.g., MCG configuration), the network node determines the "feature combination sets" that the configuration is compatible with. Using the above-mentioned matrix, the network node also determines the "feature combination sets" that are still available for the other RAT (SgNB). The other node may thus determine a configuration that is in the limits of any of the available configuration without understanding the actual configuration that the other RAT determined.

This embodiment is similar to the LTE DC capability/configuration negotiation but without the need to comprehend the other node's RAT capabilities/configurations.

A particular problem is that any change of the configuration of one node (MCG or SCG) that results in a change of the "feature combination sets" that are available requires handshaking with the peer node. In LTE DC, the MeNB has the freedom to send reconfigurations directly to the UE if those are compatible with the UEs current configuration. For LTE/NR DC, the SgNB may be able to convey reconfigurations to the UE directly (via an SCG SRB) if that reconfiguration is compatible with the current UE configuration.

It is likely that many reconfigurations do have an impact on the UE capabilities, i.e., on the list of compatible "feature combination sets". Thus, if the list of allowed features sets provided from MeNB (SgNB) to SgNB (SCG) is derived from the current MCG (SCG) configuration, most reconfigurations will require coordination among the involved nodes.

To increase the number of cases where MCG and SCG can change their configuration without informing their peer node, particular embodiments do not base the list of available "feature combination sets" on their peer's current configuration but rather on the maximum configuration that the peer might want to use.

Figure 4:
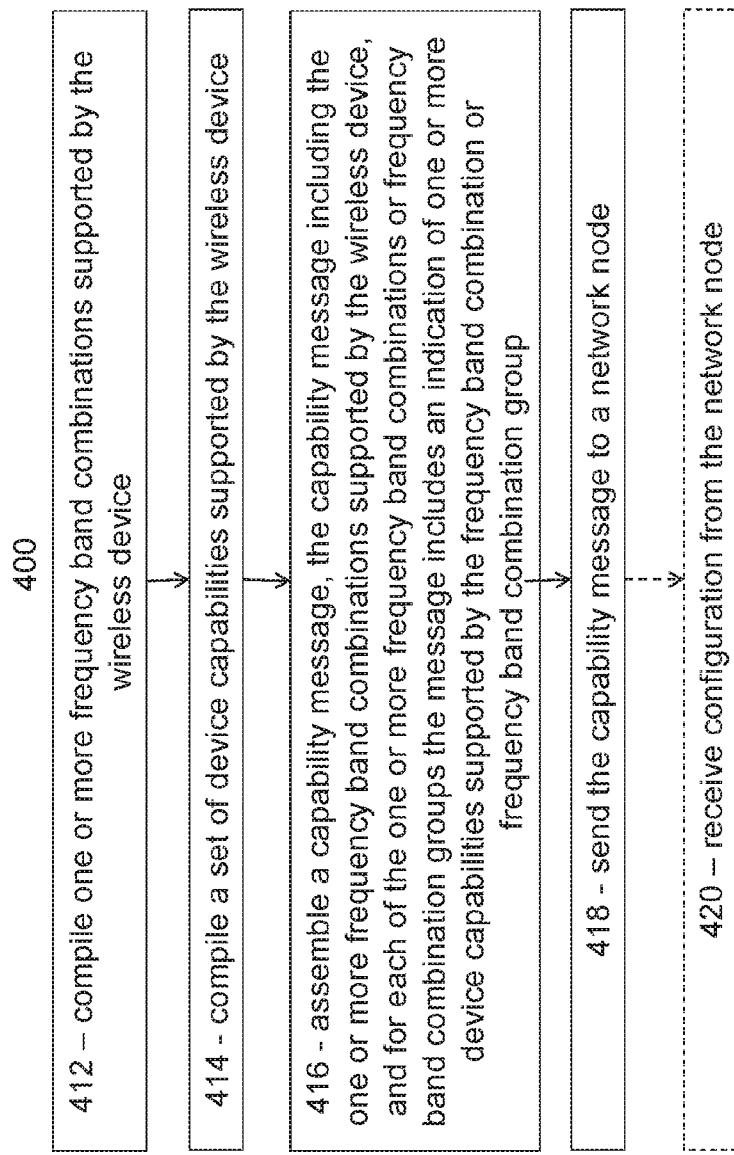
FIG. 4 is a flow diagram illustrating an example method in a wireless device, according to particular embodiments.
Figure 5:
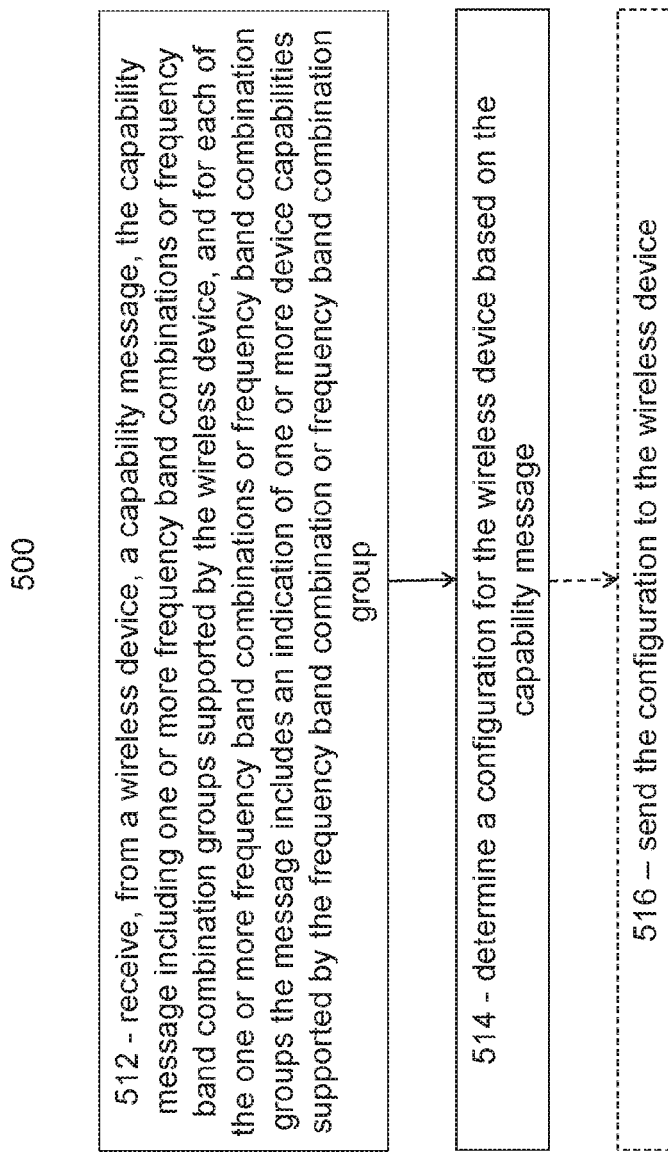
FIG. 5 is a flow diagram illustrating an example method in a network node, according to particular embodiments.

General examples of the embodiments described above are illustrated in FIGS. 4 and 5. FIG. 4 is an example in a wireless device, such as a UE, and FIG. 5 is an example in a network node, such as an eNB or gNB.

FIG. 4 is a flow diagram illustrating an example method in a wireless device, according to particular embodiments. In particular embodiments, one or more steps of FIG. 4 may be performed by wireless device 110 of network 100 described with respect to FIG. 2.

The method begins at step 412, where a wireless device compiles one or more frequency band combinations supported by the wireless device. Each frequency band combination comprises a plurality of frequency bands that the wireless device can use together for transmission or reception of wireless signals.

For example, wireless device 110 may support carriers f1, f2, f3 and f4. Carriers f1 and f2 may form a first band combination and f3 and f4 may form a second band combination. Wireless device 110 may compile the information by detecting, obtaining, or determining its own hardware (e.g., radio processors) or software features, or wireless device 110 may be preconfigured with particular bands or combinations. The wireless device may compile the frequency band combinations according to any of the embodiments and examples described above.

At step 414, the wireless device compiles a set of device capabilities supported by the wireless device. For example, wireless device 110 may support MIMO, CA, or any other suitable feature. Wireless device 110 may compile the information by detecting, obtaining, or determining its own hardware or software features, or wireless device 110 may be preconfigured with particular capabilities. The wireless device may obtain the device capabilities according to any of the embodiments and examples described above.

At step 416, the wireless device assembles a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination.

For example, wireless device 110 may assemble a capability message that includes a frequency table representing each of the frequency band combinations that it supports. The message may also include a capability table representing each of the device features supported by wireless device 110. Each row of the frequency table for a particular frequency band combination represents one frequency of the frequency combination. A column of the frequency table may include an index or pointer to one or more rows of the capability table to indicate the device features supported by the particular frequency. The entire column represents one set of capabilities for the frequency band combination. Accordingly, one column may be referred to as a first indication of the one or more device capabilities supported by the frequency band combination. The column comprises, for each band of the plurality of frequency bands, an indication of one of the one or more combinations of the device capabilities supported by the band when used in combination with the other bands in the frequency band combination. Although a column is used as an example, some embodiments may use rows instead of columns.

As a particular example, the frequency table for a frequency band combination of f1+f2+f3 includes a row for each of f1, f2, and f3. A device capability comprising 8×8 MIMO may be identified by the index 1. A device capability comprising 4×4 MIMO may be identified by the index 2. In one configuration, wireless device may support 8×8 MIMO on f1 and 4×4 MIMO on f2 and f3, and the frequency table may comprise the following:

| | |
|---|---|
| F1 | 1 |
| F2 | 2 |
| F3 | 2 |

In some embodiments, each feature in the device capability table may be associated with a cost. Wireless device 110 may assemble a capability message according to any of the embodiments and examples described above.

In particular embodiments, for each of the one or more frequency band combinations, the capability message includes a second indication of one or more device capabilities supported by the frequency band combination. The second indication of the one or more device capabilities supported by the frequency band combination comprises, for each band of the plurality of frequency bands, an indication of one of the one or more combinations of the device capabilities supported by the band when used in combination with the other bands in the frequency band combination.

For example, the frequency table for a particular frequency band combination represents may include a second column that includes an index or pointer to one or more rows of the capability table to indicate the device features supported by the particular frequency. The entire second column represents another set of capabilities for the frequency band combination.

In another configuration, wireless device may support 4×4 MIMO on f1 and f2, and 8×8 MIMO on f3, and the frequency table may comprise the following:

| | | |
|---|---|---|
| F1 | 1 | 2 |
| F2 | 2 | 2 |
| F3 | 2 | 1 |

In the examples above, a single capability is shown for ease of explanation. In particular embodiments, the device capabilities (e.g., bandwidth for the band; support for NAICS; number of MIMO layers supported; number of carriers supported in the band; number of carriers supported in the band for uplink; and number of carriers supported in the band for downlink) may include any suitable number and type of capabilities. In particular embodiments, a column may refer to a downlink capability or an uplink capability. Particular embodiments may include any suitable number of columns and rows.

At step 418, the wireless device sends the capability message to a network node. For example, wireless device 110 may send the capability message to network node 120.

At step 420, the wireless device may receive a device configuration from the network node. The device configuration comprises configuration according to one of the one or more frequency band combinations. For example, wireless device 110 may receive a device configuration from network node 120 according to one the frequency combinations that wireless device 110 previously signaled to network node 120.

Modifications, additions, or omissions may be made to method 400 of FIG. 4. Additionally, one or more steps in the method of FIG. 4 may be performed in parallel or in any suitable order. The steps may be repeated over time as necessary.

FIG. 5 is a flow diagram illustrating an example method in a network node, according to particular embodiments. In particular embodiments, one or more steps of FIG. 5 may be performed by network node 120 of network 100 described with respect to FIG. 2.

The method begins at step 512, where a network node receives, from a wireless device, a capability message. The capability message includes the one or more frequency band combinations supported by the wireless device and one or more combinations of the device capabilities supported by the wireless device. For each of the one or more frequency band combinations, the capability message includes a first indication of one or more device capabilities supported by the frequency band combination. The first indication of the one or more device capabilities supported by the frequency band combination comprises, for each band of the plurality of frequency bands, an indication of one of the one or more combinations of the device capabilities supported by the band when used in combination with the other bands in the frequency band combination.

For example, network node 120 may receive from wireless device 110 the capability message described with respect to step 416 of FIG. 4.

At step 514, the network node determines a configuration for the wireless device based on the capability message. For example, network node 120 may want to support 8×8 MIMO or CA. Based on the capability message, network node 120 determines which frequency band supports the desired feature(s) and configures wireless device 110 accordingly.

In some embodiments, a desired feature may be associated with a cost. For example, wireless device 110 may be able to support MIMO on 4 different frequency bands, but wireless device 110 may only have enough processing power to support MIMO on 2 frequency bands simultaneously. Thus, wireless device 110 may allocate 2 total credits for performing MIMO. Each MIMO instance may have a cost of 1 credit. Thus, network node 120 knows that after configuring MIMO on 2 frequency bands, network node 120 cannot configure MIMO on a third frequency band, even though the third frequency band also supports MIMO. Network node 120 may determine a configuration for wireless device 110 according to any of the embodiments and examples described above.

At step 516, the network node may send the determined configuration to the wireless. device. For example, network node 120 may send the configuration to wireless device 110.

Modifications, additions, or omissions may be made to method 500 of FIG. 5. Additionally, one or more steps in the method of FIG. 5 may be performed in parallel or in any suitable order. The steps may be repeated over time as necessary.

Figure 6B:
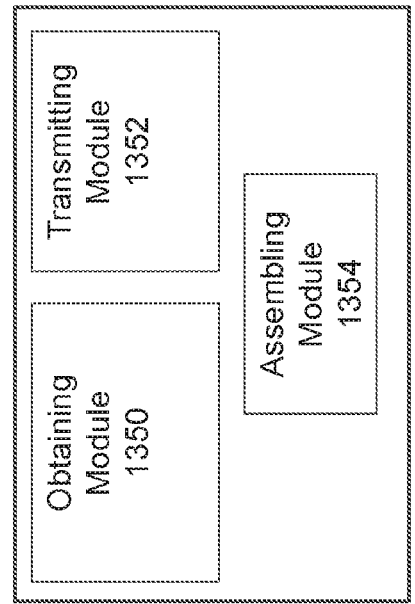
FIG. 6B is a block diagram illustrating example components of a wireless device.
Figure 6A:
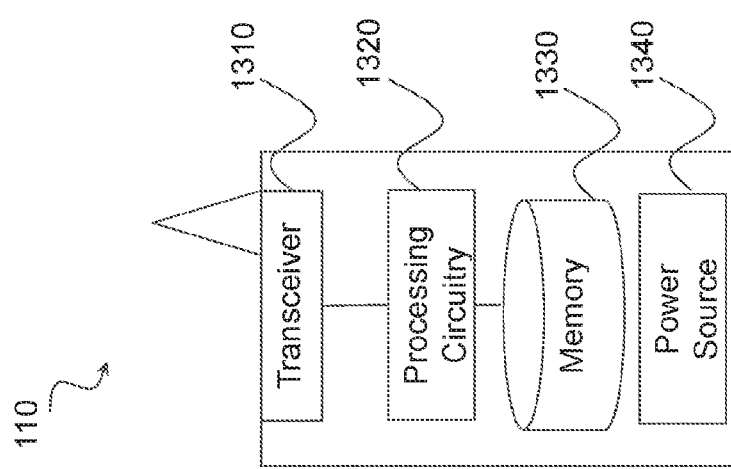
FIG. 6A is a block diagram illustrating an example embodiment of a wireless device.

FIG. 6A is a block diagram illustrating an example embodiment of a wireless device. The wireless device is an example of the wireless devices 110 illustrated in FIG. 2. In particular embodiments, the wireless device is capable of signaling device capabilities to a network node.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 6A) responsible for providing certain aspects of the wireless device's functionality, including any of the functionality described above and/or any additional functionality (including any functionality necessary to support the solution described above).

FIG. 6B is a block diagram illustrating example components of a wireless device 110. The components may include obtaining module 1350, transmitting module 1352 and assembling module 1354.

Obtaining module 1350 may perform the obtaining functions of wireless device 110. For example, obtaining module 1350 may compile (e.g., obtain, determine, etc.) frequency band information and device capability information according to any of the examples and embodiments described above. In certain embodiments, obtaining module 1350 may include or be included in processing circuitry 1320. In particular embodiments, obtaining module 1350 may communicate with transmitting module 1352 and assembling module 1354.

Transmitting module 1352 may perform the transmitting functions of wireless device 110. For example, transmitting module 1352 may transmit a capability message to a network node. In certain embodiments, transmitting module 1352 may include or be included in processing circuitry 1320. In particular embodiments, transmitting module 1352 may communicate with obtaining module 1350 and assembling module 1354.

Assembling module 1354 may perform the assembling functions of wireless device 110. For example, assembling module 1354 may assemble a capability message according to any of the examples and embodiments described above. In certain embodiments, assembling module 1354 may include or be included in processing circuitry 1320. In particular embodiments, transmitting module 1352 may communicate with obtaining module 1350 and transmitting module 1352.

Figure 7B:
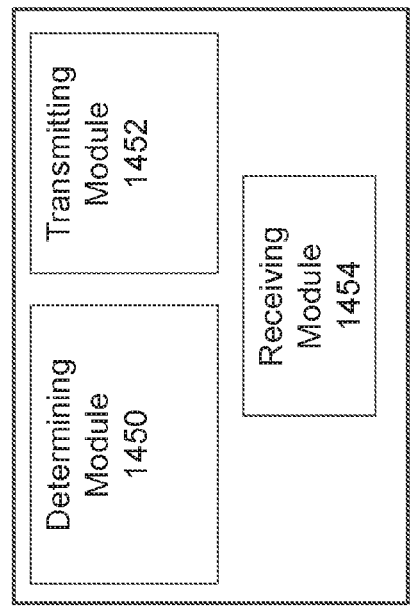
FIG. 7B is a block diagram illustrating example components of a network node.
Figure 7A:
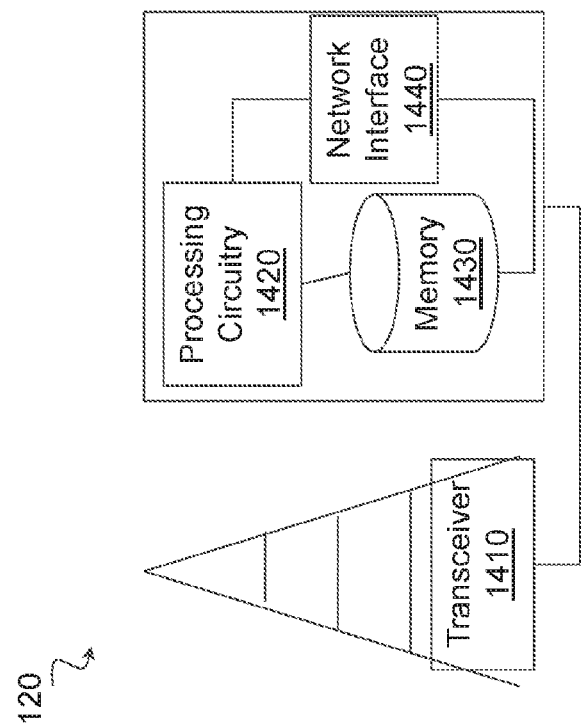
FIG. 7A is a block diagram illustrating an example embodiment of a network node.

FIG. 7A is a block diagram illustrating an example embodiment of a network node. The network node is an example of the network node 120 illustrated in FIG. 2. In particular embodiments, the network node is capable of receiving device capability information from a wireless device and determining a configuration for the wireless device based on the device capability information.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 6A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

FIG. 7B is a block diagram illustrating example components of a network node 120. The components may include determining module 1450, transmitting module 1452 and receiving module 1454.

Determining module 1450 may perform the determining functions of network node 120. For example, determining module 1450 may determine a configuration for a wireless device using device capability information according to any of the examples and embodiments described above. In certain embodiments, determining module 1450 may include or be included in processing circuitry 1420. In particular embodiments, determining module 1450 may communicate with transmitting module 1452 and receiving module 1454.

Transmitting module 1452 may perform the transmitting functions of network node 120. For example, transmitting module 1452 may transmit a device configuration to a wireless device according to any of the examples and embodiments described above. In certain embodiments, transmitting module 1452 may include or be included in processing circuitry 1420. In particular embodiments, transmitting module 1452 may communicate with determining module 1450 and receiving module 1454.

Receiving module 1454 may perform the receiving functions of network node 120. For example, receiving module 1454 may receive a device capability message from a wireless device according to any of the examples and embodiments described above. In certain embodiments, receiving module 1454 may include or be included in processing circuitry 1420. In particular embodiments, transmitting module 1452 may communicate with determining module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
5G Fifth Generation
BBU Baseband Unit
BC Band Combination
BPC Baseband Processing Capabilities
BTS Base Transceiver Station
CA Carrier Aggregation
CC Component Carrier
CN Core Network
CQI Channel Quality Information
CSI Channel State Information
D2D Device to Device
DC Dual Connectivity
DFT Discrete Fourier Transform
DMRS Demodulation Reference Signal
eMBB Enhanced Mobile Broadband
eNB eNodeB
EUTRAN Evolved UMTS Terrestrial Radio Access Network
FDD Frequency Division Duplex
FFT Fast Fourier Transform
gNB Next-generation NodeB
LAA Licensed-Assisted Access
LBT Listen-before-talk
LTE Long Term Evolution
LTE-U LTE in Unlicensed Spectrum
M2M Machine to Machine
MCS Modulation and Coding Scheme
MIB Master Information Block
MIMO Multiple-Input Multiple-Output
MME Mobility Management Entity
MTC Machine Type Communication
NAICS Network-Assisted Interference Cancellation and Suppression
NR New Radio
OFDM Orthogonal Frequency Division Multiplexing
PRB Physical Resource Block
PUCCH Physical Uplink Control Channel
PUSCH Physical Uplink Shared Channel
RAN Radio Access Network
RAT Radio Access Technology
RBS Radio Base Station
RNC Radio Network Controller
RRC Radio Resource Control
RRH Remote Radio Head
RRM Radio Resource Management
RRU Remote Radio Unit
SCell Secondary Cell
SI System Information
SIB System Information Block
SR Scheduling Request
TB Transport Block
TBS Transport Block Size
TDD Time Division Duplex
TTI Transmission Time Interval
UE User Equipment
UL Uplink
URLLC Ultra Reliable Low Latency Communication
UTRAN Universal Terrestrial Radio Access Network
WAN Wireless Access Network

The invention claimed is:

1. A method of signaling device capabilities for use in a wireless device of a wireless communication network, the method comprising:
compiling one or more frequency band combinations supported by the wireless device, each frequency band combination comprising a plurality of frequency bands that the wireless device can use together for transmission or reception of wireless signals;
compiling a set of device capabilities supported by the wireless device;
assembling a capability message, the capability message including:
a first table comprising the one or more frequency band combinations supported by the wireless device;
a second table separate from the first table comprising one or more combinations of the device capabilities supported by the wireless device on one or more bands of the one or more frequency band combinations, and wherein each combination in the second table is different than the other combinations in the second table;
wherein, for each of the one or more frequency band combinations, the capability message includes a first indication of one or more device capabilities supported by the frequency band combination, wherein the first indication of the one or more device capabilities supported by the frequency band combination comprises, for each band of the plurality of frequency bands, an indication of one of the one or more combinations of the device capabilities supported by the band when used in combination with the other bands in the frequency band combination; and
sending the capability message to a network node.

2. The method of claim 1, wherein, for each band of the plurality of frequency bands, the indication of one of the one or more combinations of the device capabilities supported by the band when used in combination with the other bands in the frequency band combination comprises an indication of uplink device capabilities and an indication of downlink capabilities.

3. The method of claim 1, wherein, for each of the one or more frequency band combinations, the capability message includes a second indication of one or more device capabilities supported by the frequency band combination, wherein the second indication of the one or more device capabilities supported by the frequency band combination comprises, for each band of the plurality of frequency bands, an indication of one of the one or more combinations of the device capabilities supported by the band when used in combination with the other bands in the frequency band combination.

4. The method of claim 1, wherein each of the one or more combinations of the device capabilities is associated with an index, and the indication of one of the one or more combinations of the device capabilities supported by the band comprises the index of one of the one or more combinations of the device capabilities.

5. The method of claim 1, wherein the device capabilities include at least one capability selected from a group of:
   bandwidth for the band;
   support for network-assisted interference cancellation and suppression (NAICS);
   number of multiple input multiple output (MIMO) layers supported;
   number of carriers supported in the band;
   number of carriers supported in the band for uplink; and
   number of carriers supported in the band for downlink.

6. The method of claim 1, wherein the set of device capabilities includes a cost associated with each device capability, the cost representing an amount of device processing power required to perform the capability.

7. The method of claim 1, further comprising receiving a device configuration from the network node, the device configuration comprising configuration according to one of the one or more frequency band combinations.

8. A wireless device capable of signaling device capabilities, the wireless device comprising:
   processing circuitry operable to:
      compile one or more frequency band combinations supported by the wireless device, each frequency band combination comprising a plurality of frequency bands that the wireless device can use together for transmission or reception of wireless signals;
      compile a set of device capabilities supported by the wireless device;
      assemble a capability message, the capability message including:
         a first table comprising the one or more frequency band combinations supported by the wireless device;
         a second table separate from the first table comprising one or more combinations of the device capabilities supported by the wireless device on one or more bands of the one or more frequency band combinations, and wherein each combination in the second table is different than the other combinations in the second table;
         wherein, for each of the one or more frequency band combinations, the capability message includes a first indication of one or more device capabilities supported by the frequency band combination, wherein the first indication of the one or more device capabilities supported by the frequency band combination comprises, for each band of the plurality of frequency bands, an indication of one of the one or more combinations of the device capabilities supported by the band when used in combination with the other bands in the frequency band combination; and
      send the capability message to a network node.

9. The wireless device of claim 8, wherein, for each band of the plurality of frequency bands, the indication of one of the one or more combinations of the device capabilities supported by the band when used in combination with the other bands in the frequency band combination comprises an indication of uplink device capabilities and an indication of downlink capabilities.

10. The wireless device of claim 8, wherein, for each of the one or more frequency band combinations, the capability message includes a second indication of one or more device capabilities supported by the frequency band combination, wherein the second indication of the one or more device capabilities supported by the frequency band combination comprises, for each band of the plurality of frequency bands, an indication of one of the one or more combinations of the device capabilities supported by the band when used in combination with the other bands in the frequency band combination.

11. The wireless device of claim 8, wherein each of the one or more combinations of the device capabilities is associated with an index, and the indication of one of the one or more combinations of the device capabilities supported by the band comprises the index of one of the one or more combinations of the device capabilities.

12. The wireless device of claim 8, wherein the device capabilities include at least one capability selected from a group of:
   bandwidth for the band;
   support for network-assisted interference cancellation and suppression (NAICS);
   number of multiple input multiple output (MIMO) layers supported;
   number of carriers supported in the band;
   number of carriers supported in the band for uplink;
   number of carriers supported in the band for downlink.

13. The wireless device of claim 8, wherein the set of device capabilities includes a cost associated with each device capability, the cost representing an amount of device processing power required to perform the capability.

14. The wireless device of claim 8, the processing circuitry further to receive a device configuration from the network node, the device configuration comprising configuration according to one of the one or more frequency band combinations.

15. A method of signaling device capabilities for use in a network node of a wireless communication network, the method comprising:
   receiving, from a wireless device, a capability message, the capability message including:
      a first table comprising the one or more frequency band combinations supported by the wireless device;
      a second table separate from the first table comprising one or more combinations of the device capabilities supported by the wireless device on one or more bands of the one or more frequency band combinations, and wherein each combination in the second table is different than the other combinations in the second table;
      wherein, for each of the one or more frequency band combinations, the capability message includes a first indication of one or more device capabilities supported by the frequency band combination, wherein the first indication of the one or more device capabilities supported by the frequency band combination comprises, for each band of the plurality of frequency bands, an indication of one of the one or more combinations of the device capabilities supported by the band when used in combination with the other bands in the frequency band combination; and
   determining a configuration for the wireless device based on the capability message.

16. The method of claim 15, wherein, for each band of the plurality of frequency bands, the indication of one of the one or more combinations of the device capabilities supported by the band when used in combination with the other bands in the frequency band combination comprises an indication of uplink device capabilities and an indication of downlink capabilities.

17. The method of claim 15, wherein, for each of the one or more frequency band combinations, the capability message includes a second indication of one or more device capabilities supported by the frequency band combination, wherein the second indication of the one or more device capabilities supported by the frequency band combination comprises, for each band of the plurality of frequency bands, an indication of one of the one or more combinations of the device capabilities supported by the band when used in combination with the other bands in the frequency band combination.

18. The method of claim 15, wherein each of the one or more combinations of the device capabilities is associated with an index, and the indication of one of the one or more combinations of the device capabilities supported by the band comprises the index of one of the one or more combinations of the device capabilities.

19. The method of claim 15, wherein the device capabilities include at least one capability selected from a group of:
bandwidth for the band;
support for network-assisted interference cancellation and suppression (NAICS);
number of multiple input multiple output (MIMO) layers supported;
number of carriers supported in the band;
number of carriers supported in the band for uplink; and
number of carriers supported in the band for downlink.

20. The method of claim 15, wherein the set of device capabilities includes a cost associated with each device capability, the cost representing an amount of device processing power required to perform the capability.

* * * * *